US008527728B2

(12) United States Patent
Clerc et al.

(10) Patent No.: US 8,527,728 B2
(45) Date of Patent: Sep. 3, 2013

(54) MANAGEMENT OF MULTIPLE SOFTWARE IMAGES WITH RELOCATION OF BOOT BLOCKS

(75) Inventors: David Clerc, Verbier (CH); Jacques Fontignie, Onex (CH); Luis Garcés-Erice, Zurich (CH); Claudio Marinelli, Latina (IT); John G. Rooney, Zurich (CH); Marc Vuilleumier Stückelberg, Cartigny (CH)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/325,299

(22) Filed: Dec. 14, 2011

(65) Prior Publication Data
US 2012/0151201 A1 Jun. 14, 2012

(30) Foreign Application Priority Data
Dec. 14, 2010 (EP) .................... 10194866

(51) Int. Cl.
*G06F 12/00* (2006.01)
(52) U.S. Cl.
USPC .................................................. 711/165
(58) Field of Classification Search
None
See application file for complete search history.

(56) References Cited

U.S. PATENT DOCUMENTS

| 6,098,158 | A | 8/2000 | Lay et al. |
|---|---|---|---|
| 6,567,774 | B1 | 5/2003 | Lee et al. |
| 6,973,447 | B1 * | 12/2005 | Aguilar et al. ............... 713/2 |
| 7,809,919 | B2 * | 10/2010 | Thompson .................. 711/201 |
| 2002/0073201 | A1 * | 6/2002 | French et al. ............... 709/227 |
| 2003/0126242 | A1 | 7/2003 | Chang |
| 2008/0027950 | A1 | 1/2008 | Fukumi |
| 2008/0301425 | A1 | 12/2008 | Mittapalli et al. |
| 2009/0049160 | A1 | 2/2009 | Cherian et al. |
| 2009/0193245 | A1 | 7/2009 | Isaacson |
| 2012/0151202 | A1 * | 6/2012 | Clerc et al. .................... 713/2 |

FOREIGN PATENT DOCUMENTS

JP 2008003815 A 1/2008

OTHER PUBLICATIONS

Retrieved Sep. 12, 2011; http://www.windowsnetworking.com/articles_tutorials/What-Dynamic-Virtual-Client-Computing-Whats-Problem-VDI-Why-XP-Mode-Good-Thing.html; T. Shinder, "What is Dynamic Virtual Client Computing? Or, What's the Problem with VDI and Why XP Mode is a Good Thing", pp. 1-5, Sep. 2009.

(Continued)

*Primary Examiner* — Hiep Nguyen
(74) *Attorney, Agent, or Firm* — Cantor Colburn, LLP; Susan Murray

(57) ABSTRACT

A method, system and computer program product for managing multiple software images in a data processing entity. At least part of the memory blocks of each of the software images is stored into a corresponding image portion of a mass memory. A current software image stored in a current image is selected. The memory blocks stored in boot locations of the current software image are relocated to a relocation portion of the mass memory. The boot blocks of the current software image are copied into the corresponding boot location. The data processing entity is booted from the boot blocks of the current software image in the corresponding boot locations and each request to access a selected memory block of the current software image by the access function is served.

20 Claims, 18 Drawing Sheets

(56) References Cited

OTHER PUBLICATIONS

Retrieved Apr. 22, 2010; http://www.open-mag.com/features/Vol_132/compellent_sir/compellent_sir.html; J. Fegreus, "Real Magic with Virtual Snapshots", pp. 1-7, Mar. 2008.

Retrieved Apr. 22, 2010; http://www.thefreelibrary.com/SANRAD+and+emBoot+team+to+deliver+iSCSI+diskless+boot-a0134957464; "SANRAD and emBoot team to deliver iSCSI diskless boot", pp. 1-2, Jul. 2005.

* cited by examiner

MANAGEMENT OF MULTIPLE SOFTWARE IMAGES WITH RELOCATION OF BOOT BLOCKS

PRIORITY

The present application claims priority to European Patent Application No. 10194866.9, filed on 14 Dec. 2010, and all the benefits accruing therefrom under 35 U.S.C. §119, the contents of which in its entirety are herein incorporated by reference.

BACKGROUND

The present invention relates to data processing, and more particularly, to the management of software images.

Generally speaking, a software image is a structure that includes software modules residing on a computer (for example, its operating system, application programs, and/or data).

In some cases, it may be desirable to have multiple operating systems available on the same computer. For example, this may be useful to run programs that require different operating systems, or to test new operating systems or new versions thereof.

For this purpose, it is possible to exploit a multi-boot technique. The multi-boot technique allows installing multiple operating systems on the computer, with the possibility of choosing which one to boot when the computer is started. The desired result is achieved by splitting a hard disk of the computer into multiple partitions, each one defining a logical disk storing a corresponding operating system. The computer boots from a primary partition, which includes a boot loader that allows selecting the actual operating system to be started. Alternatively, it is possible to provide a boot partition with a primary boot loader that is simply used to select the desired operating system; the primary boot loader then invokes a secondary boot loader of the selected operating system for its starting.

However, the multi-boot technique is quite rigid, since the partitions of the hard disk are to be defined in advance. In any case, once the selected operating system has been started it has the entire control of the whole hard disk; therefore, the selected operating system may access the other partitions as well (with the risk of damaging them).

Alternatively, the same result may also be achieved by exploiting a virtualization technique. In this case, a hypervisor is installed on the computer. The hypervisor implements a virtualization layer, which emulates multiple virtual machines each one consisting of an abstract environment giving the appearance of a physical computer (which the virtual machine has sole control of). In this way, it is possible to have different operating systems running independently (even at the same time) on corresponding virtual machines.

However, the virtualization technique requires the installation of a complex infrastructure to manage the virtual machines. Moreover, this involves a performance degradation of the computer (since the operating systems do not run natively on the computer any longer).

U.S. Patent Application No. 2009/0193245, the entire disclosure of which is herein incorporated by reference in its entirety, also discloses a method for converting a multi-boot computer into virtual machines. For this purpose, a boot record of the computer is configured to load a hosting operating system that manages the virtual machines. The virtual machines are generated from the corresponding boot images by a converter, which detects and applies the same configurations, and resolves any conflict that may be caused by the concurrent run of the virtual machines. As above, this requires the installation of a virtualization layer (implemented by the hosting operating system); moreover, the operating systems again run in a virtualized environment (provided by the hosting operating system) with corresponding performance degradation.

Another common need is that of making backup copies of the software image of a computer. For example, this may be useful to restore the content of the computer in case of a malfunction.

For this purpose, it is possible to take a snapshot of the software image (i.e., a backup copy thereof in a consistent state at a particular point of time) and the snapshot may be saved onto a backup disk or a backup server. In this way, it is possible to restore the snapshot by re-installing it onto the computer from the backup disk or the back server. However, the process of restoring the snapshot is very slow. In addition, the use of the backup server involves a high consumption of network resources, and moreover, a network connection with the backup server is required to restore the snapshot from it. Alternatively, it is possible to boot the computer remotely from the snapshot on the backup server. However, in this case the computer has to be always connected to the backup server for its operation. In any case, the operation of the computer over the network will result in a degradation of its performance.

SUMMARY

According to exemplary embodiments, a method, apparatus, and computer program product are provided for managing multiple software images in a data processing entity that includes a mass memory with a plurality of memory locations, each of the memory locations having a corresponding memory address within the mass memory, each of the software images including a plurality of memory blocks, each of the memory blocks having a corresponding image address within the software image, which include storing at least part of the memory blocks of each of the software images into a corresponding image portion of the mass memory, each of the memory blocks being stored into the memory location having the memory address equal to the corresponding image address plus an offset of the image portion within the mass memory, selecting a current software image stored in a current image, relocating the memory blocks stored in boot locations of the current software image to a relocation portion of the mass memory, the boot locations of the current software image being the memory locations having the memory addresses equal to the image addresses of boot blocks of the current software image including the memory blocks thereof required to boot the data processing entity up to load an access function adapted to access the current software image, copying the boot blocks of the current software image into the corresponding boot locations, booting the data processing entity from the boot blocks of the current software image in the corresponding boot locations thereby loading the access function, and serving each request to access a selected memory block of the current software image by the access function, the access function accessing the selected memory block in the memory location having the memory address equal to the corresponding image address plus the offset of the current image portion.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Figure 1:
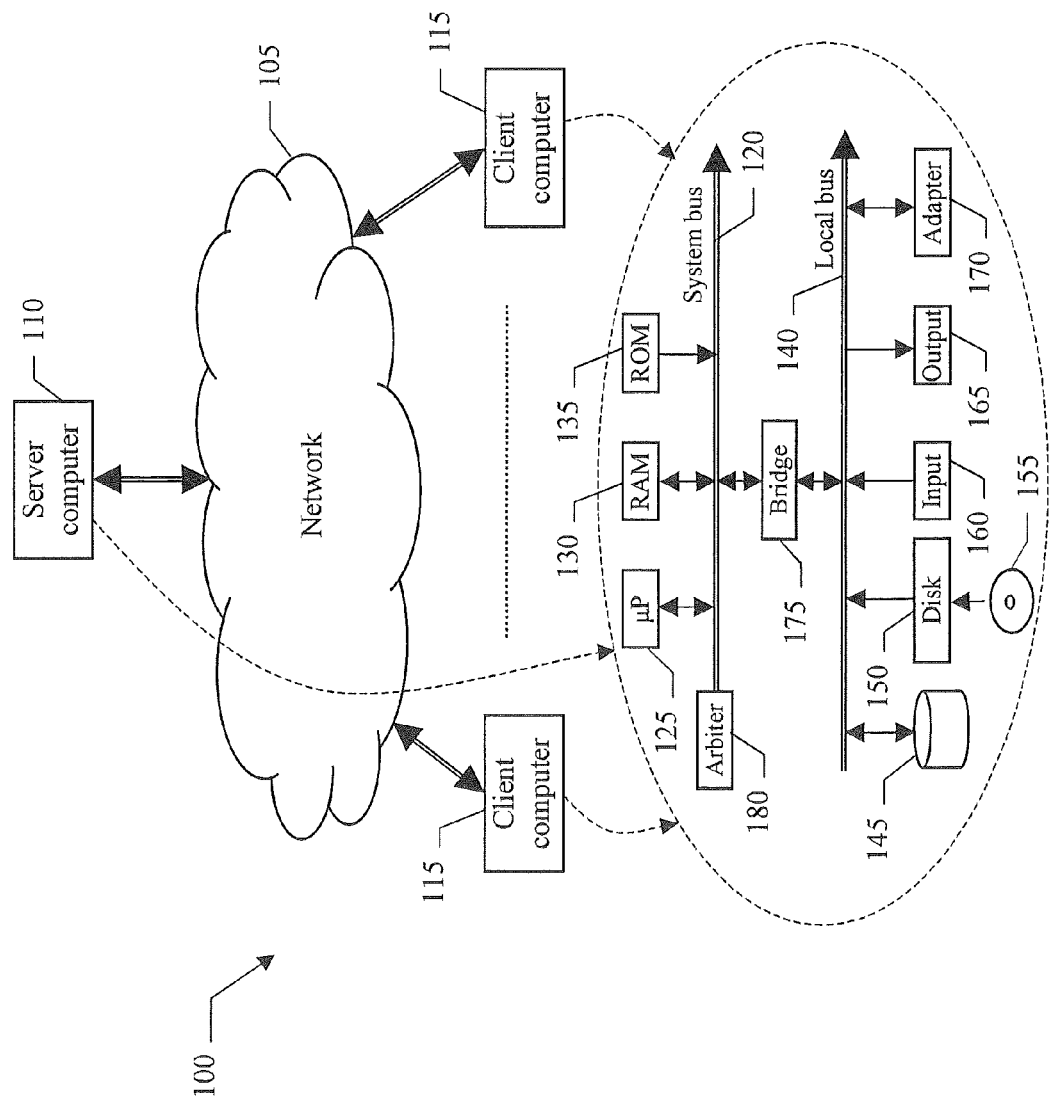
FIG. 1 shows a schematic block diagram of a data-processing system in accordance with an embodiment.

With reference in particular to FIG. 1, there is shown a schematic block diagram of a data processing system (or simply "system") 100 in accordance with an embodiment of the present invention. The system 100 has a distributed architecture, which is based on a network 105 (e.g., local area network or "LAN"). Multiple computers are connected one to another through the network 105. Particularly, a server computer 110 controls the deployment of software images onto client computers 115. Only two client computers 115 are shown in the figure for the sake of simplicity. Each software image is a structure that includes one or more software modules (for example, operating systems, application programs, and/or data).

A generic (server or client) computer of the system 100 is formed by several units that are connected in parallel to a system bus 120 (with a structure that is suitably scaled according to the actual function of the computer in the system 100). In detail, one or more microprocessors (μP) 125 control operation of the computer. A random access memory (RAM) 130 is used as a working memory by the microprocessors 125, and a read only memory (ROM) 135 stores basic code of the computer. Several peripheral units are clustered around a local bus 140 (by means of respective interfaces). Particularly, a mass memory includes one or more hard-disks 145 and drives 150 for reading optical disks 155, (for example, digital video discs or "DVDs" and compact discs or "CDs"). Moreover, the computer includes input units 160 (for example, a keyboard and a mouse) and output units 165 (for example, a monitor and a printer). An adapter 170 is used to connect the computer to the network 105. A bridge unit 175 interfaces the system bus 120 with the local bus 140. Each microprocessor 125 and the bridge unit 175 can operate as master agent requesting an access to the system bus 120 for transmitting information. An arbiter 180 manages the granting of the access with mutual exclusion to the system bus 120.

A collaboration diagram representing the roles of the main software components that may be used to implement a deployment process according to an embodiment of the invention is shown in FIG. 2A-FIG. 2K. Particularly, the figures describe the static structure of the system (by means of the corresponding components, denoted as a whole with the reference 200) and its dynamic behavior (by means of a series of exchanged messages, each one representing a corresponding action, denoted with progressive sequence numbers proceeded by the symbol "A").

Figure 2A:
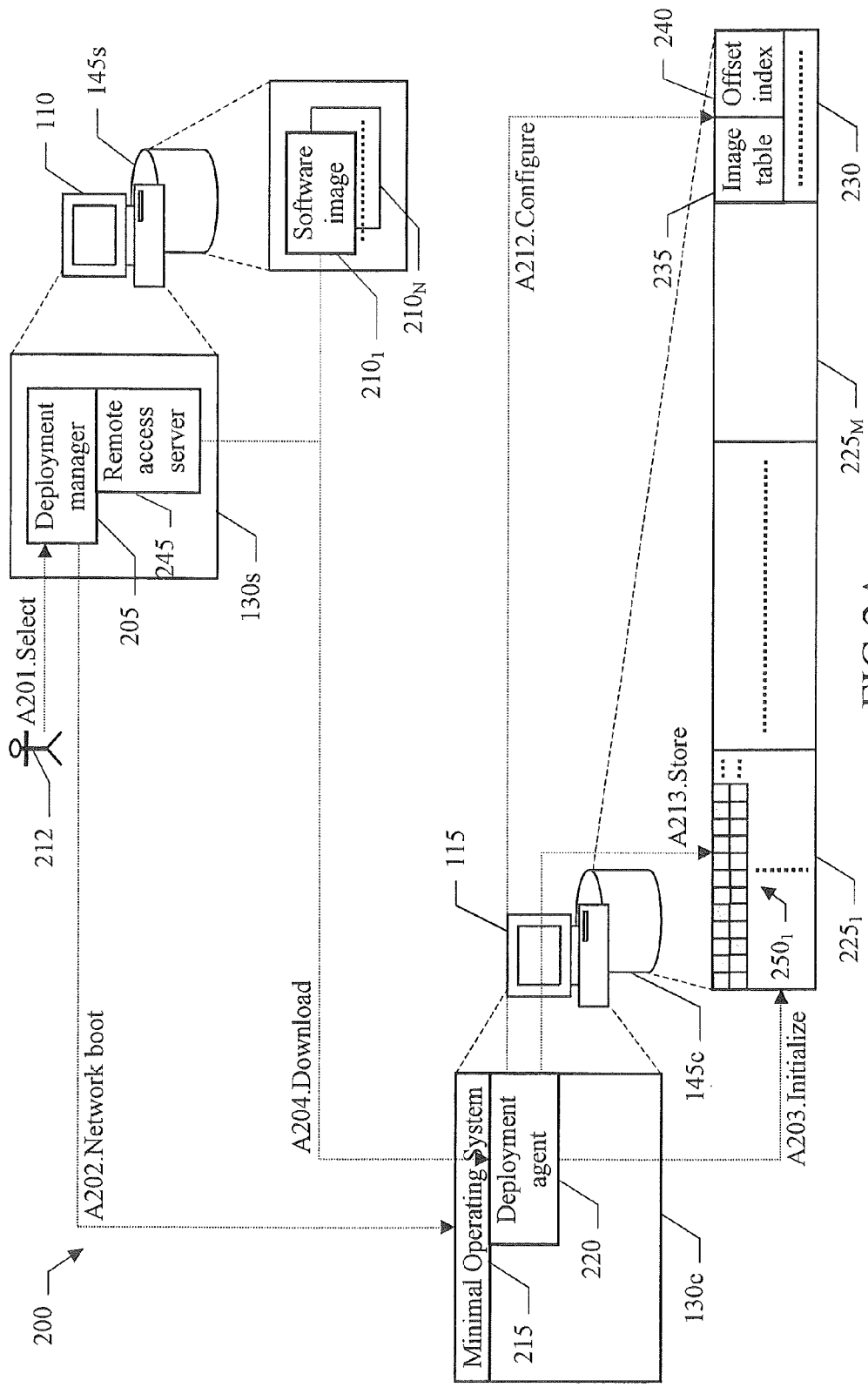
FIG. 2A-FIG. 2K show a collaboration diagram representing the roles of software components that may be used to implement a deployment process in accordance with an embodiment.

Starting with FIG. 2A, the server computer 110 (with its working memory and mass memory, denoted with the references 130s and 145s, respectively) runs a deployment manager 205, for example, the IBM® Tivoli® Provisioning Manager for Images of the IBM® Tivoli® Provisioning Manager for OS Deployment. (IBM and Tivoli are trademarks of International Business Machines Corporation registered in many jurisdictions worldwide.) The deployment manager 205 is used to automate the deployment of software images $210_i$ (with i=1 ... N) onto the client computers of the system. The software images $210_i$ are stored in a corresponding repository. Each software image $210_i$ includes a set of memory blocks, which have corresponding addresses within the software image $210_i$ (referred to as image addresses). The memory blocks may include any kind of information (for example, one or more sectors, files, libraries, directories, combinations or portions thereof, either relating to the operating system or the application programs).

Particularly, whenever a new software image $210_i$ (for example, the software image $210_1$) is to be deployed onto a specific client computer 115 (with its working memory and mass memory, denoted with the references 130c and 145c, respectively), an operator 212 of the system selects the client computer 115 and new software image 210, through the deployment manager 205. The selection is performed, for example, by connecting with a browser running on another client computer, not shown in the figure (action "A201.Select"). In response thereto, the deployment manager 205 turns on the client computer 115. As a consequence, assuming that the client computer 115 does not have any functioning operating system, it boots over the network (not shown in the figure). Particularly, a boot loader stored in a firmware of the client computer 115 that is executed when it is turned on, for example, the basic input/output system (BIOS), does not find any bootable device, and then launches a network boot loader, for example, the preboot execution environment (PXE) embedded in its network adapter. The network boot loader exploits a dynamic address service, for example, based on the dynamic host configuration protocol (DHCP), to obtain a dynamic address for the client computer 115 from the server computer 110 (acting as a DHCP server). The server computer 110 also provides an address of a network bootstrap program that is downloaded into a RAM disk of the client computer 115, i.e., a portion of its working memory 130c that is treated as a mass memory, and then launched. The network bootstrap program, for example, the Microsoft Windows Preinstallation Environment, provides a minimal operating system 215, which includes a deployment agent 220 for interacting with the deployment manager 205 (action "A202.Network boot"). (Microsoft and Windows are trademarks of Microsoft Corporation in the United States, other countries, or both.)

The deployment agent 220 initializes the mass memory 145c by logically splitting it into a plurality of image portions $225_j$ (with j=0 ... M, for example, M=2-10) and a service portion 230. The image portions $225_j$ (each one for storing a software image) are all the same size (at least equal to the biggest software image that may be installed thereon) and are arranged in succession from the beginning of the mass memory 145c. The service portion 230 (for storing service information) is smaller and is arranged at the end of the mass memory 145c. Particularly, the service portion 230 stores an image table 235, which includes status information of the image portions $225_j$. For example, for each image portion $225_j$ the image table 235 includes a record with a flag indicating its availability, i.e., free or used (all being de-asserted at the beginning to indicate that all the image portions $225_j$ are free), and an offset indicating its position within the mass memory 145c from the beginning thereof (being calculated according to the size of the image portions $225_j$). The service portion 230 also stores an offset index 240, which indicates the offset of the image portion $225_j$ that is currently active (action "A203.Initialize").

The deployment agent 220 then downloads a set of boot blocks of the new software image 210₁ from the server computer 110. For this purpose, the deployment agent 220 acts as a remote access initiator that interacts with a remote access server 245 of the server computer 110, for example, based on the Internet small computer system interface (iSCSI) protocol. The boot blocks include the memory blocks that are needed to start a boot sequence of the new software image 210₁ up to load the deployment agent 220. For example, in Microsoft Windows the boot blocks include (in addition to the deployment agent 220) a master boot record (MBR), a boot sector, a bootmgr.exe file, a boot\bcd file, a system registry, a winload.exe file, and driver files specified in the system registry (action "A204.Download").

At this point, the deployment agent 220 identifies the initial image portion 225₁ as free to receive the new software image 210₁ (since it is the first one with the corresponding flag de-asserted in the image table 235). As a consequence, the deployment agent 220 accordingly updates the image table 235 (by asserting the flag of the image portion 225₁ to indicate that is used) and the offset index 240 (by setting it to the offset of the new image portion 225₁ as indicated in the image table 235, zero in this case, to indicate that it is the current one). The deployment agent 220 saves the image addresses of the boot blocks into the record associated with the current image portion 225₁ in the image table 235. The deployment agent 220 also creates a location map, not shown in the figure, in the current image portion 225₁ (at its end, after a portion thereof reserved for storing the new software image 210₁). For each memory block of the software image 210₁, the location map includes a flag indicating its availability in the mass memory 145c, all being de-asserted at the beginning to indicate that no memory block is available yet in the mass memory 145c (action "A212.Configure"—with the actions corresponding to the skipped sequence numbers that will be described in the following). The deployment agent 220 then stores the boot blocks of the new software image 210₁ into the current image portion 225₁, i.e., into the memory locations of the mass memory 145c having their addresses in the mass memory 145c (referred to as memory addresses) equal to the corresponding image addresses plus the offset of the current image portion 225₁, where they are shown in light shading and denoted with the reference 250₁. At the same time, the corresponding flags in the location table are asserted (to indicate that the boot blocks are now available in the mass memory 145c). Since in this case the offset of the current image portion 225₁ is zero, the boot blocks 250₁ are arranged in the mass memory 145c exactly where they are expected to be found during the boot sequence (action "A213.Store"). At this point, the deployment agent 220 turns off and then turns on the client computer 115.

Figure 2B:
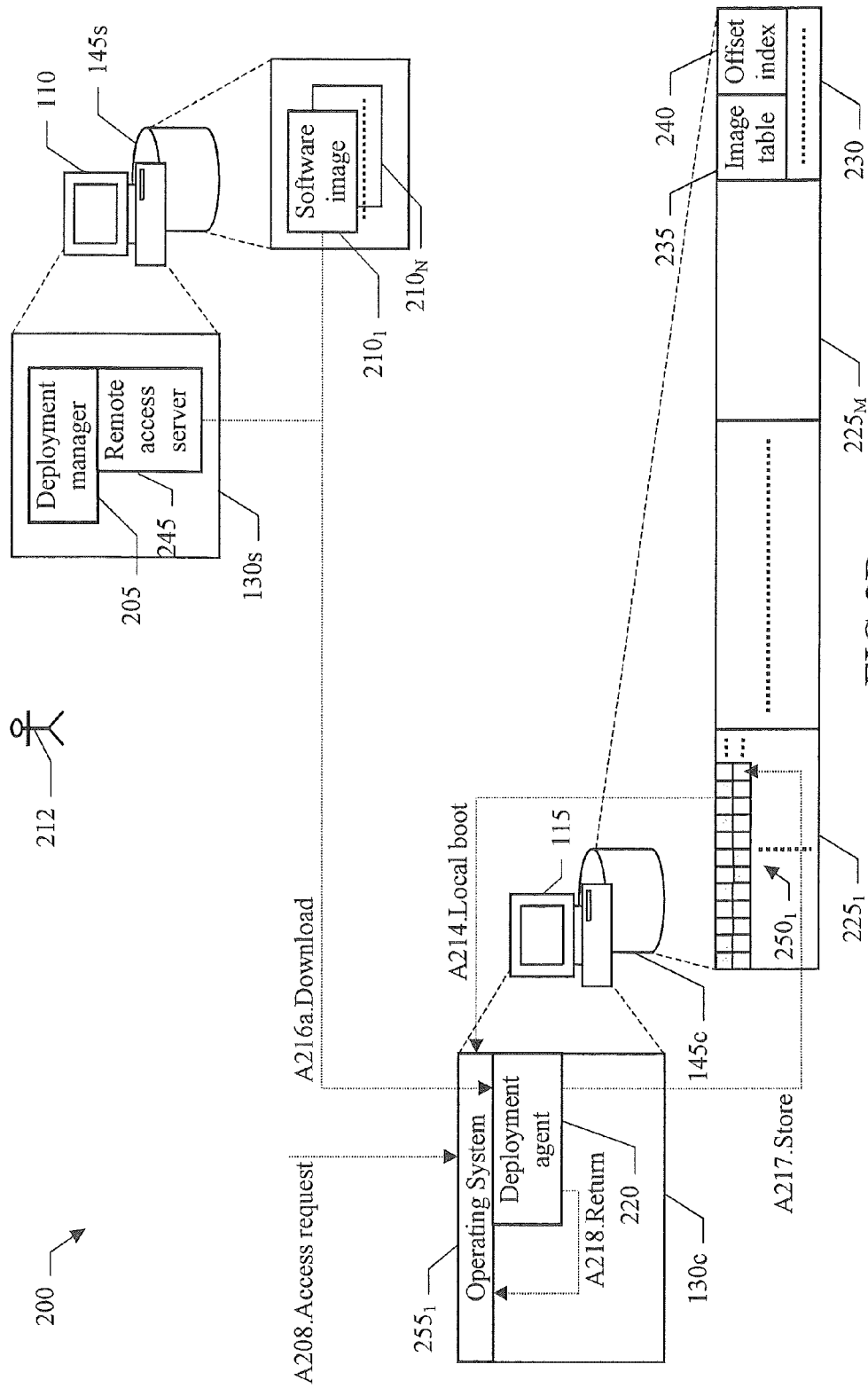

Therefore, as shown in FIG. 2B, the client computer 115 boots normally from the mass memory 145c. Indeed, the boot loader of the client computer 115 that is executed at its turn on now identifies the mass memory 145c as a bootable device, so that it boots locally from its boot blocks 250₁. In this way, a portion of an actual operating system of the new software image 210₁ corresponding to the boot blocks 250₁ (denoted with the reference 255₁) and the deployment agent 220 are loaded into the working memory 130c. For example, in Microsoft Windows the BIOS loads the MBR, the MBR loads the boot sector, the boot sector finds and starts the bootmgr.exe file, the bootmgr.exe finds and reads the boot\bcd file to determine the memory location of and then loads the system registry, the winload.exe file, and the driver files specified in the system registry, and the winload.exe starts the deployment agent 220. When the size of the new software image 210₁ is different (i.e., lower) than the size of the current image portion 225₁, the deployment agent 220 also resizes it so as to occupy the entire current image portion 225₁. This operation is very fast, since it only requires updating a file system structure, not shown in the figure, of the operating system 255₁ (action "A214.Local boot"). Every request of accessing a selected memory block of the new software image 210₁ during operation of the client computer 115 is now served by a streaming driver of the deployment agent 220 (which overrides a standard file-system driver, not shown in the figure, of the operating system 255₁).

Particularly, the file system driver receives a request for accessing (i.e., read) the selected memory block, for example, from an application program, not shown in the figure (action "A215.Access request"). The request is passed to the deployment agent 220, which verifies whether the selected memory block is available in the current image portion 225₁ (as indicated in its location map). When the selected memory block is not available in the current image portion 225₁ (i.e., its flag in the location map is de-asserted), the deployment agent 220 passes the request to a remote access driver, not shown in the figure, of the operating system 255₁ (acting as an iSCSI initiator in the example at issue). The remote access driver downloads the selected memory block from the software image 210₁ (on the server computer 110) through the remote access server 245. The remote access driver then returns the selected memory block to the deployment agent 220 (action "A216a.Download"). The deployment agent 220 stores the selected memory block into the current image portion 225₁ (through a physical disk driver, not shown in the figure, of the operating system 255). Particularly, the selected memory block is stored into the memory location having the memory address equal to its image address plus the offset of the current image portion 225₁ (which offset, zero in this case, is extracted from the offset table 240). Moreover, the deployment agent 220 updates the location map accordingly, so as to indicate the availability of the selected memory block, i.e., by asserting the corresponding flag (action "A217.Store"). At this point, the deployment agent 220 returns the selected memory block to the file system driver, which in turn returns it to the application program (action "A218.Return").

Figure 2C:
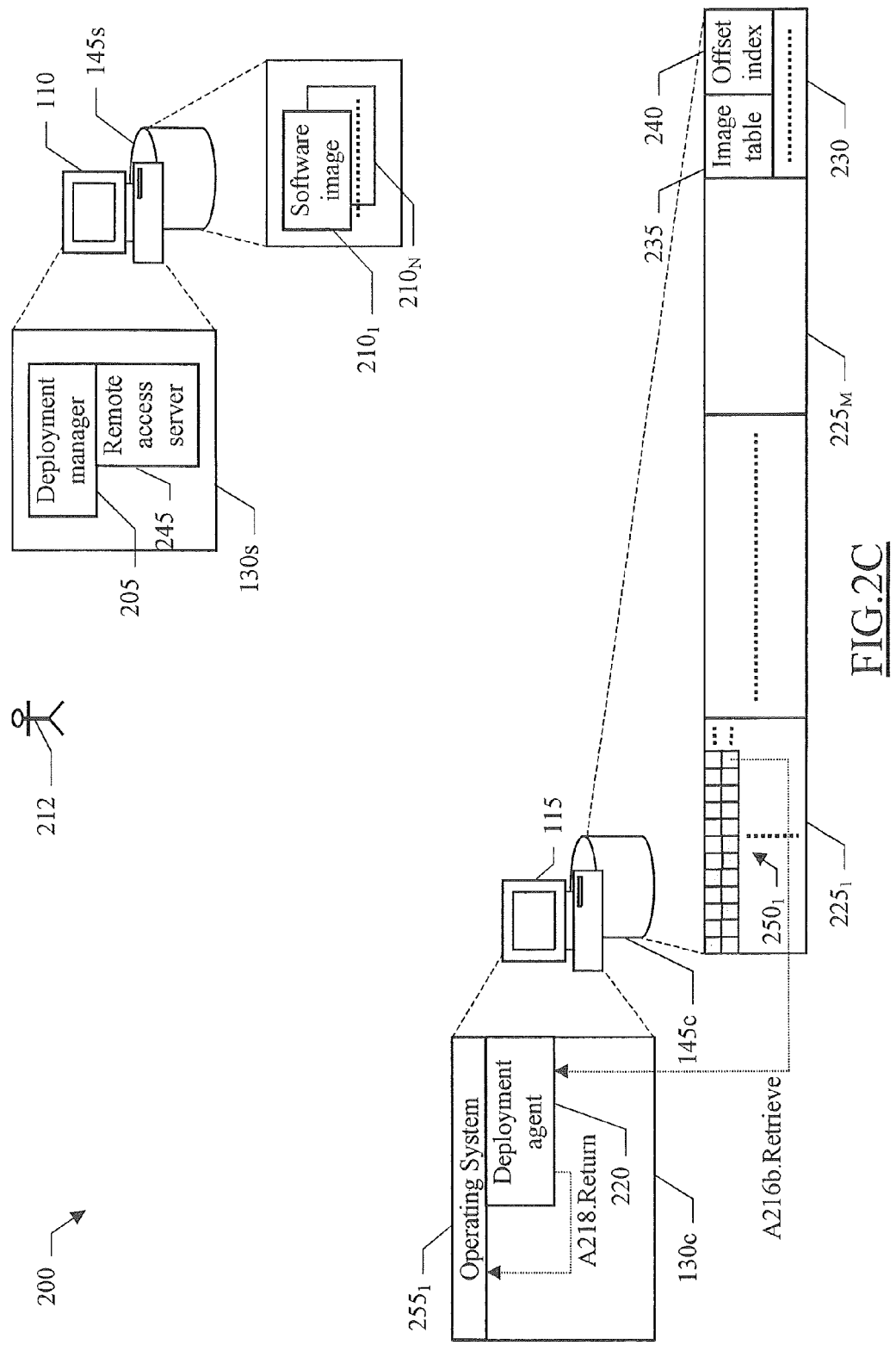

Conversely, as shown in FIG. 2C, if the selected memory block is already available in the current image portion 225₁ (i.e., its flag in the location map is asserted), the deployment agent 220 passes the request to the physical disk driver. The physical disk driver directly retrieves the selected memory block from the current image portion 225₁, i.e., from the memory location having the memory address equal to its image address plus the offset of the current image portion 225₁ (zero in this case). The physical disk driver then returns the selected memory block to the deployment agent 220 (action "A216b.Retrieve"). In this case as well, the deployment agent 220 returns the selected memory block to the file-system driver, which in turn returns it to the application program (same action "A218.Return").

The above described streaming technique makes the client computer 115 ready to use in a very short time, just after the boot blocks of the new software image 210₁ have been stored into the mass memory 145c, even if the deployment process is still in progress (for example, after 1-2 minutes for a typical size of the boot blocks of 10-200 Megabytes). The operation of the client computer 115 is then entirely normal (with its booting directly from the mass memory 145c as usual), irrespectively of the availability or not of the other memory blocks of the software image 210₁ in the mass memory 145c. This occurs with only a slight degradation of performance of the client computer 115 when it accesses memory blocks that are still to be downloaded from the server computer 110. Moreover, the time required to have the client computer 115 ready to use is independent of the size of the new software image 210$_1$. The usage of the network also decreases over time (for example, with a logarithmic law), since more and more memory blocks will be already available on the client computer 115 once they have been accessed once. In this respect, it should be noted that this streaming technique has nothing to do with the ones that are known in the art for providing software images on demand. Indeed, in the known streaming techniques, memory blocks of the software images are downloaded onto the client computer only for their immediate use. However, these memory blocks are not stored permanently on the client computer (i.e., they disappear after they have been used, and in any case after the client computer is turned off), so that they have to be downloaded again for any next use thereof. As a consequence, the client computer can never be disconnected from the server computer. Indeed, even when the memory blocks are pre-fetched, they remain on the client computer only until their (possible) next use. Likewise, even when a local cache for the memory blocks is implemented, only few memory blocks remain in the local cache for their re-use (in any case, with the least recently used memory blocks in the local cache that are ultimately evicted for storing new memory blocks).

Figure 2D:
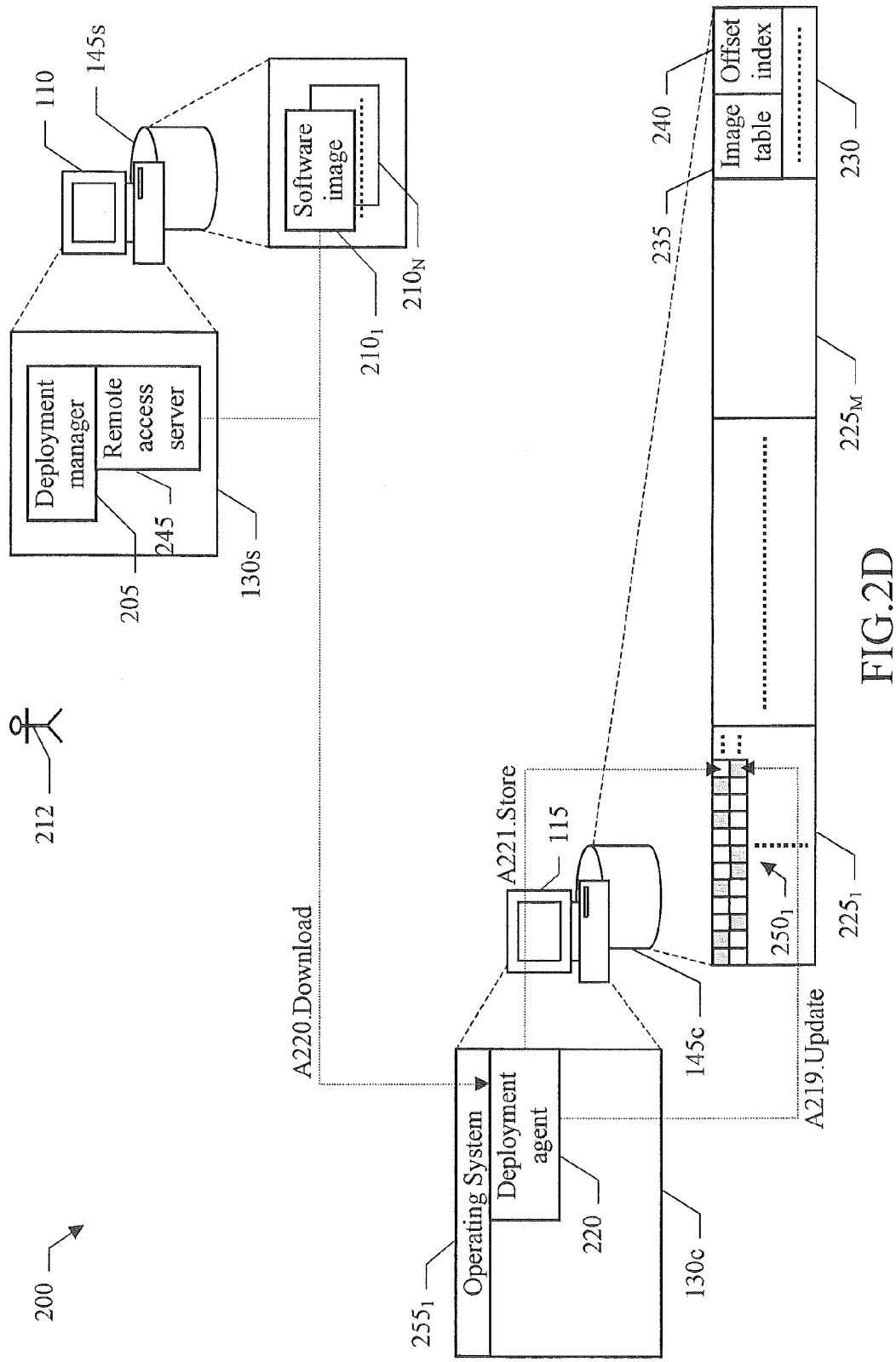

With reference now to FIG. 2D, if the selected memory block has been requested for writing, the deployment agent 220 passes the request to the physical disk driver. The physical disk driver directly updates the selected memory block in the current image portion 225$_1$, i.e., at the memory location having the memory address equal to its image address plus the offset of the current image portion 225$_1$ (zero in this case), where it is always available after the reading thereof (action "A219.Update"). Therefore, the current image portion 225$_1$ can be updated normally (as if the new software image 210$_1$ was already completely deployed onto the client computer 115) even when the deployment process is still in progress.

In a completely asynchronous way, the deployment agent 220 periodically verifies (for example, every 10-100 milliseconds) a workload of the server computer 110, of the client computer 115 and/or of the network connecting them. If the workload is lower than a predefined threshold (indicating that the corresponding resources are under exploited at the moment, for example, because no action is performed on the server computer 110 and/or on the client computer 115, and traffic in the network is low), the deployment agent 220 downloads a new memory block that is still not available in the current image portion 225$_1$ (for example, the first one whose flag in the location map is de-asserted) by repeating the same operations described above (action "A220.Download"). As above, the deployment agent 220 stores this new memory block into the current image portion 225$_1$ (through the physical disk driver), i.e., into the memory location having the memory address equal to its image address plus the offset of the current image portion 225$_1$ (zero in this case). Moreover, the deployment agent 220 updates the location map accordingly, so as to indicate the availability of the new memory block (action "A221.Store").

Figure 2E:
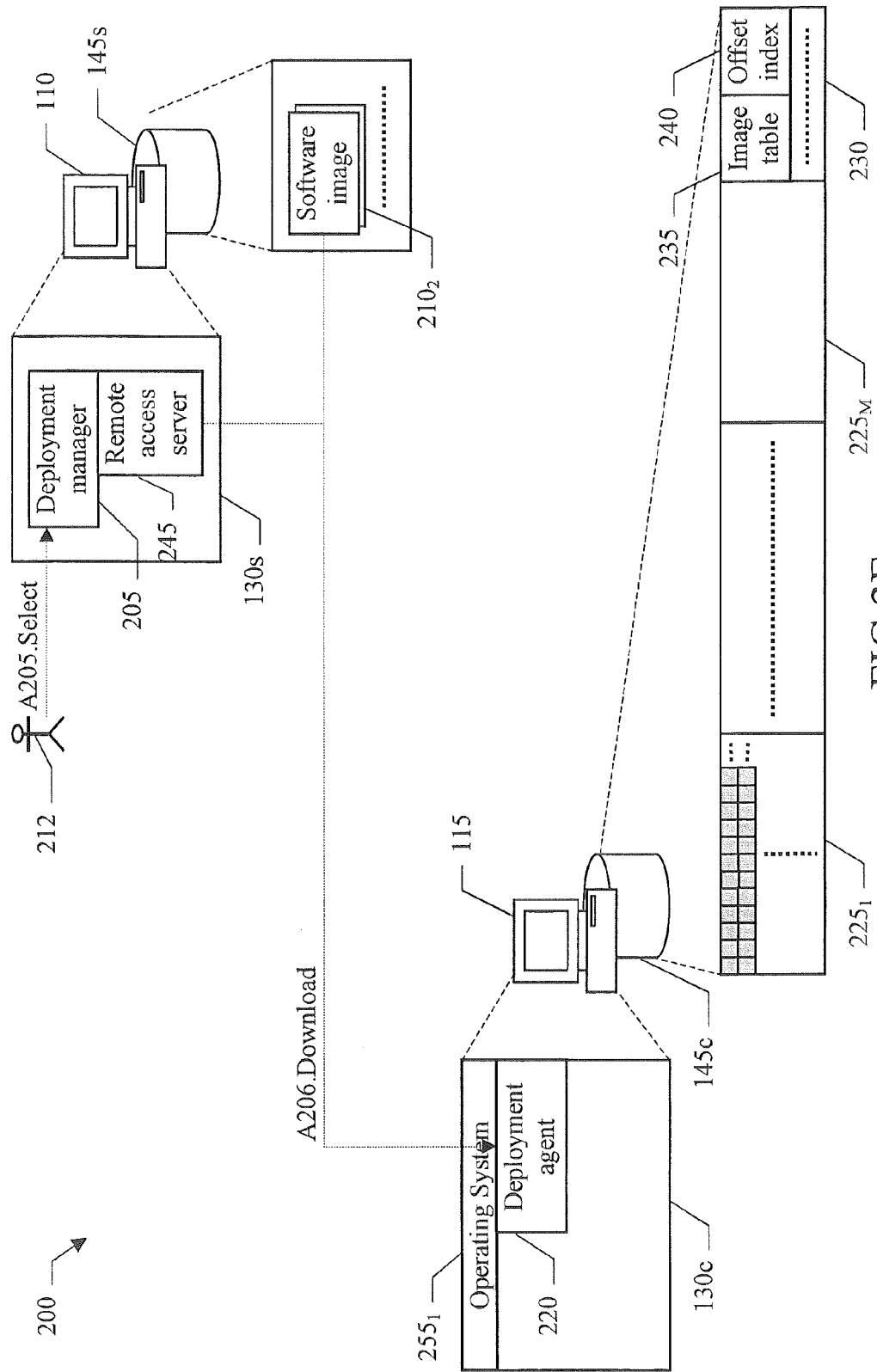

In this way, as shown in FIG. 2E, it is possible to ensure that all the memory blocks of the new software image 210$_1$ will be downloaded at the end (even if they are never used).

At any time, the operator 212 may also select another new software image 210$_i$ (for example, the software image 210$_2$) to be deployed onto the same client computer 115 through the deployment manager 205 (action "A205.Select"). In response thereto, as above the deployment agent 220 downloads the boot blocks of the new software image 210$_2$ from the server computer 110 through the remote access server 245 (action "A206.Download").

Figure 2F:
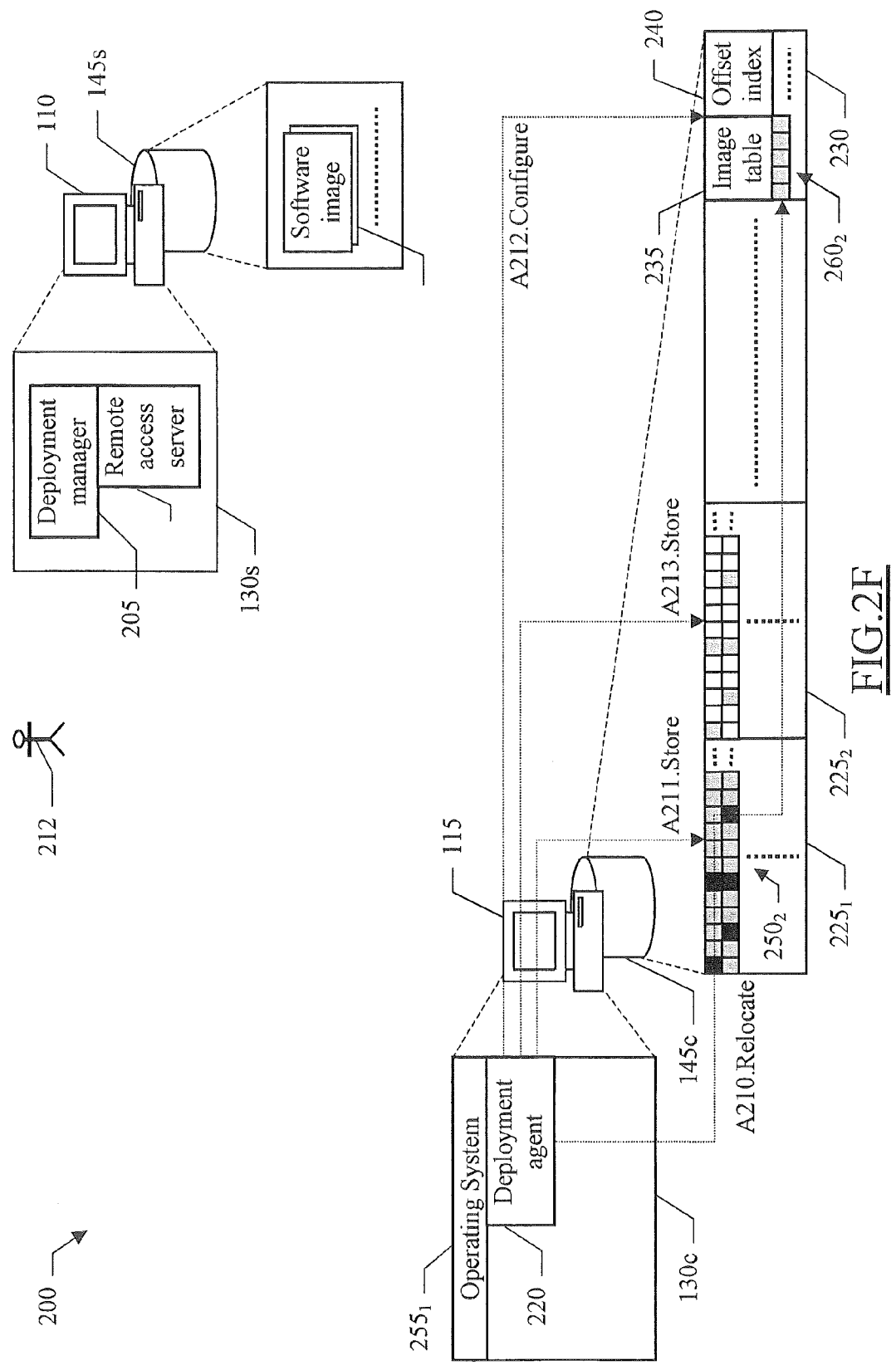

Moving to FIG. 2F, the deployment agent 220 relocates the memory blocks of the initial image portion 225$_1$ that are stored in boot locations of the new software image 210$_2$ (i.e., in the memory locations having their memory addresses equal to the image addresses of the boot blocks of the new software image 210$_2$). Particularly, these memory blocks are moved to the service portion 230 (to a dedicated relocation portion thereof), where they are referred to as relocated memory blocks 260$_2$ (action "A210.Relocate"). The deployment agent 220 then stores the boot blocks of the new software image 210$_2$ into their boot locations, where they are shown in dark shading and denoted with the reference 250$_2$. In this way, the boot blocks 250$_2$ are again arranged in the mass memory 145$c$ exactly where they are expected to be found during the boot sequence. Nevertheless, this does not cause any loss of information in the initial image portion 225$_1$, since the corresponding memory blocks that are overridden are saved in the service portion 230 (action "A211.Store").

The deployment process then continues exactly as above. Particularly, the deployment agent 220 identifies an image portion 225$_i$ that is free to receive the new software image 210$_2$ (i.e., the image portion 225$_2$ in the example a tissue). As a consequence, the deployment agent 220 accordingly updates the image table 235 (by asserting the flag of the image portion 225$_2$ to indicate that is used) and the offset index 240 (by setting it to the offset of the image portion 225$_2$ to indicate that it is the current one). Moreover, the deployment agent 220 saves the image addresses of the boot blocks 250$_2$ into the record associated with the current image portion 225$_2$ in the image table 235. The deployment agent 220 also creates the corresponding location map (not shown in the figure) in the current image portion 225$_2$ (same action "A212.Configure"). The deployment agent 220 then stores the boot blocks of the new software image 210$_2$ into the current image portion 225$_2$, i.e., into the memory locations of the mass memory 145$c$ having the memory addresses equal to their image addresses plus the offset of the current image portion 225$_2$, where they are shown in light shading (same action "A213.Store"). At this point, the deployment agent 220 turns off and then turns on the client computer 115.

Figure 2G:
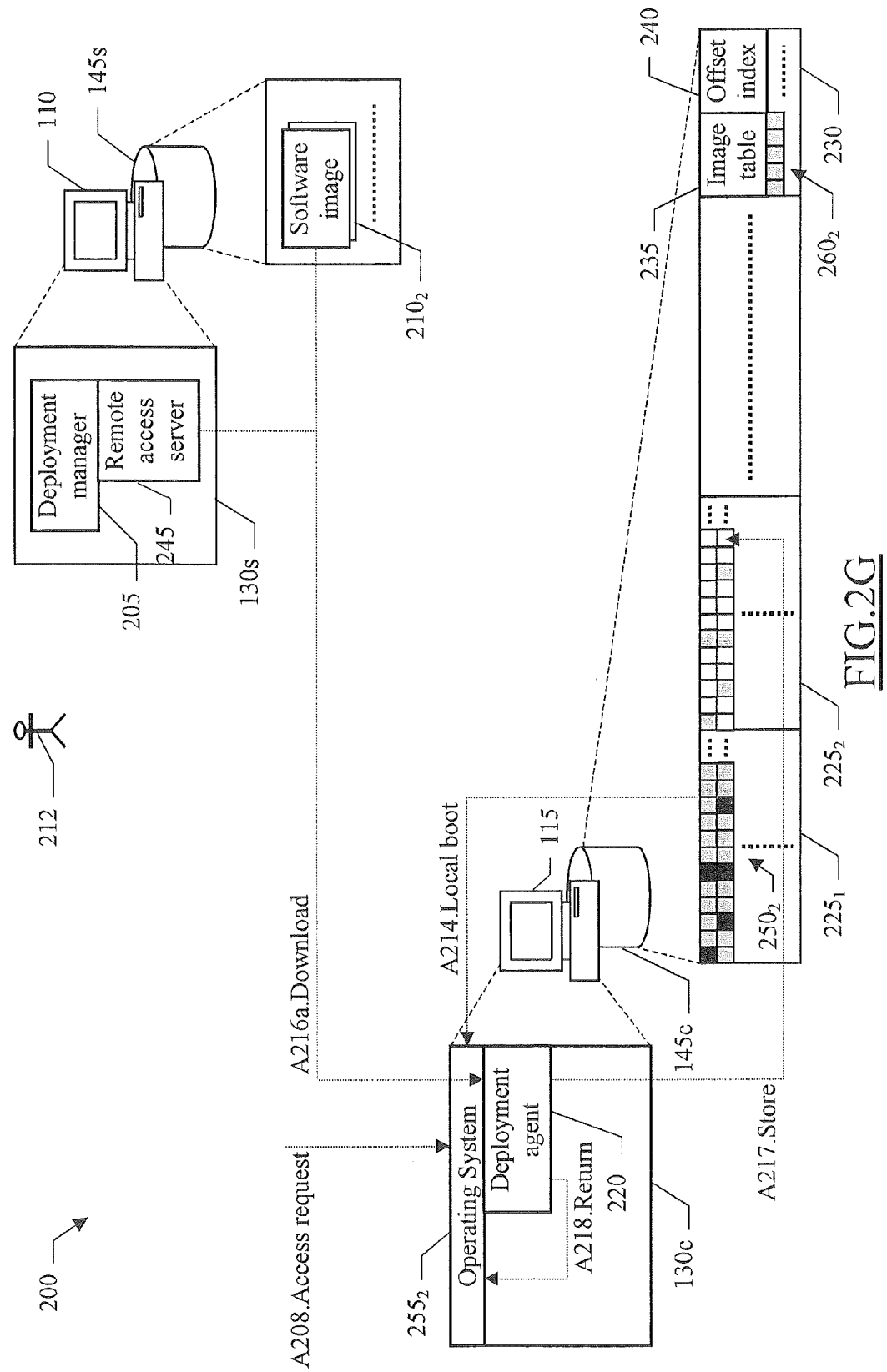

Therefore, as shown in FIG. 2G, the boot loader of the client computer 115 now boots from its boot blocks 250$_2$. In this way, a portion of an operating system of the new software image 210$_2$ corresponding to the boot blocks 250$_2$ (denoted with the reference 255$_2$) and the deployment agent 220 are loaded into the working memory 130$c$ (same action "A14.Local boot"). Every request of accessing a selected memory block of the software image 210$_2$ during operation of the client computer 115 is again served by the streaming driver of the deployment agent 220.

Particularly, in response to a request for accessing (in read) a selected memory block of the new software image 210$_2$ (same action "A215.Access request"), if the selected memory block is not available in the current image portion 225$_2$ it is downloaded from the software image 210$_2$ on the server computer 110 (same action "A216a.Download"), stored into the current image portion 225$_2$ (same action "A217.Store"), and then returned (same action "A218.Return").

Figure 2H:
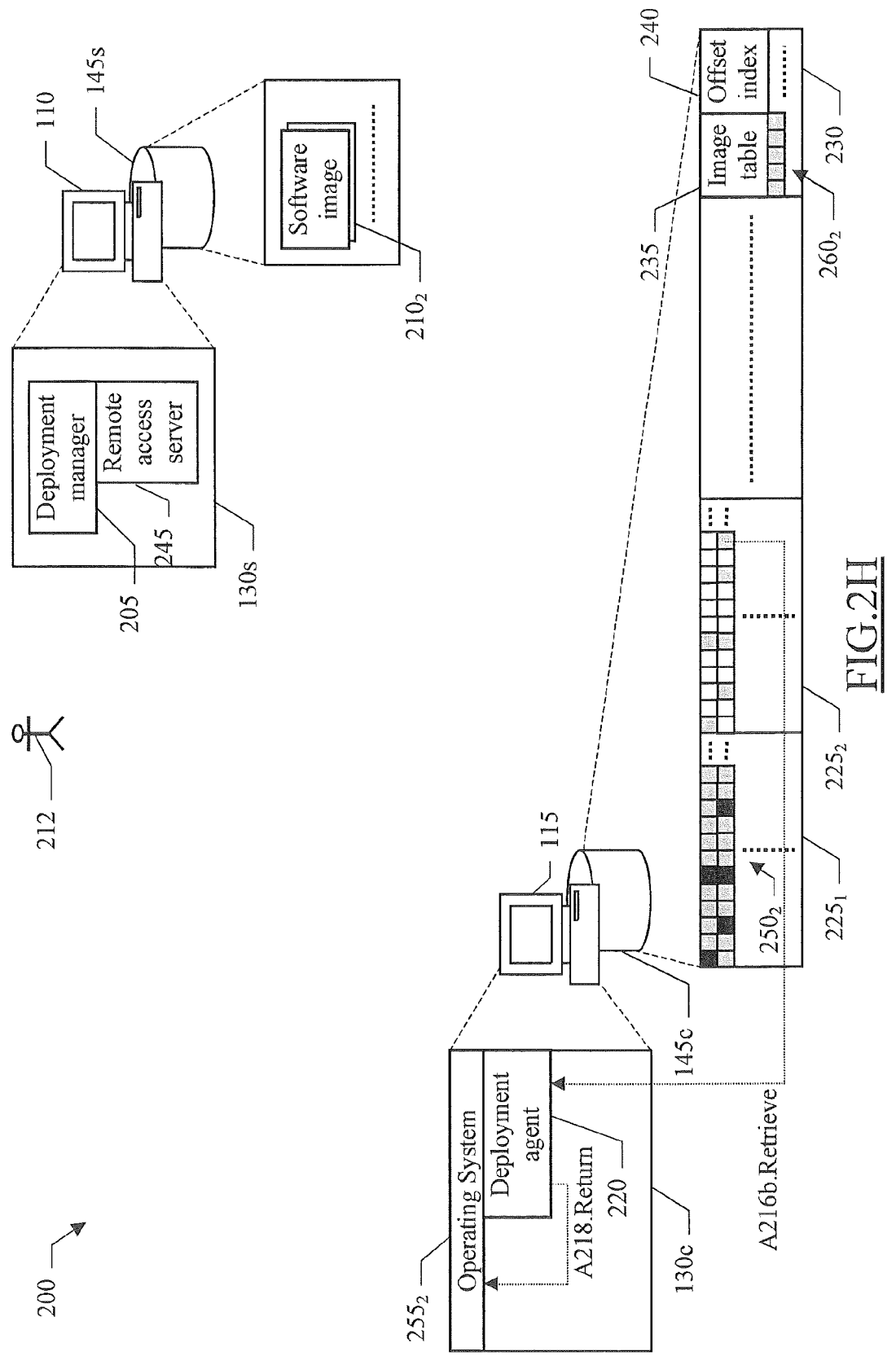

Conversely, as shown in FIG. 2H, if the selected memory block is already available in the current image portion 225$_2$, it is directly retrieved (same action "A216b.Retrieve"), and then returned (same action "A218.Return").

Figure 2I:
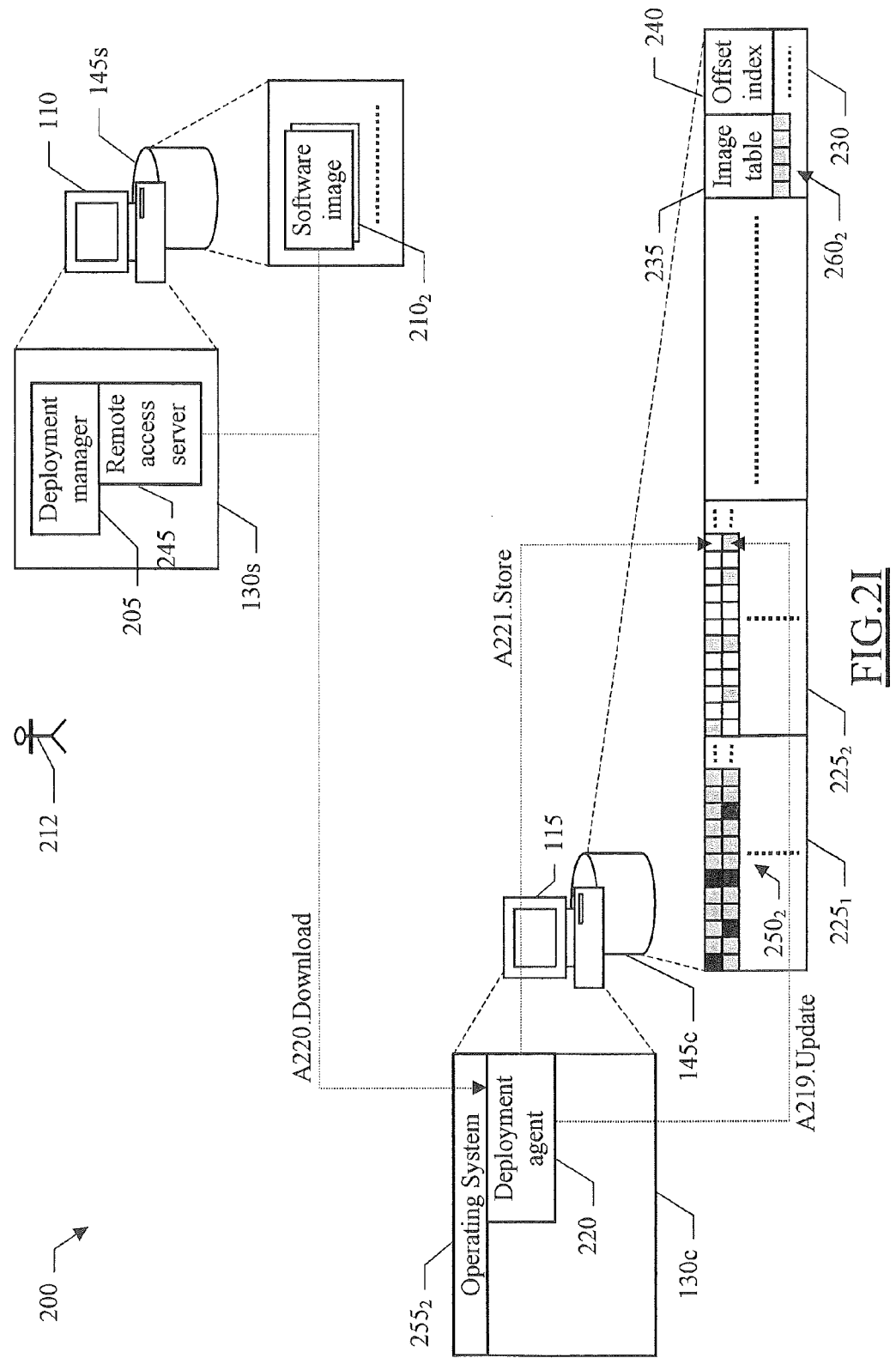

With reference now to FIG. 2I, if the selected memory block has been requested for writing, it is updated in the current image portion $225_2$ (same action "A219.Update"). When the workload is low, a new memory block that is still not available in the current image portion $225_2$ is downloaded (same action "A220.Download"), and stored into the current image portion $225_2$ (same action "A221.Store").

Figure 2J:
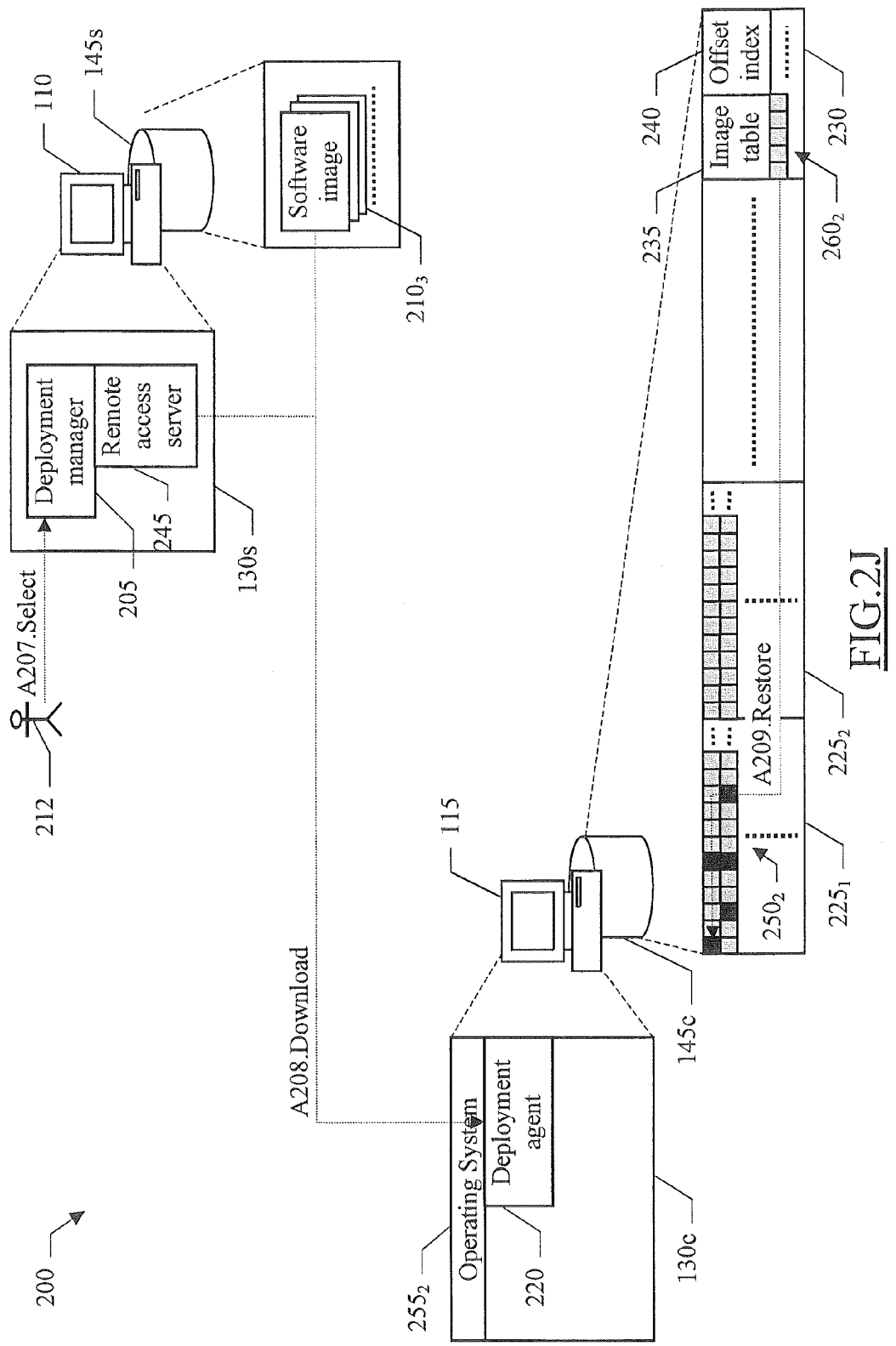

With reference now to FIG. 2J (showing the software image $210_2$ completely downloaded), at any time the operator 212 may select another new software image $210_i$ (for example, the software image $210_3$) to be deployed onto the same client computer 115 through the deployment manager 205 (action "A207.Select"). In response thereto, as above the deployment agent 220 downloads the boot blocks of the new software image $210_3$ from the server computer 110 through the remote access server 245 (action "A208.Download"). At this point, the deployment agent 220 restores the relocated memory blocks $260_2$ from the service portion 230 to the initial image portion $225_1$, i.e., into the boot locations of the current image portion $225_2$ (as indicated in the corresponding record of the image table 235). This operation does not cause any loss of information in the boot blocks $250_2$ of the current image portion $225_2$ that are overridden, since their up-to-date values (as possibly updated during the operation of the client computer 115 as explained above) are stored in the current image portion $225_2$ (action "A209.Restore").

Figure 2K:
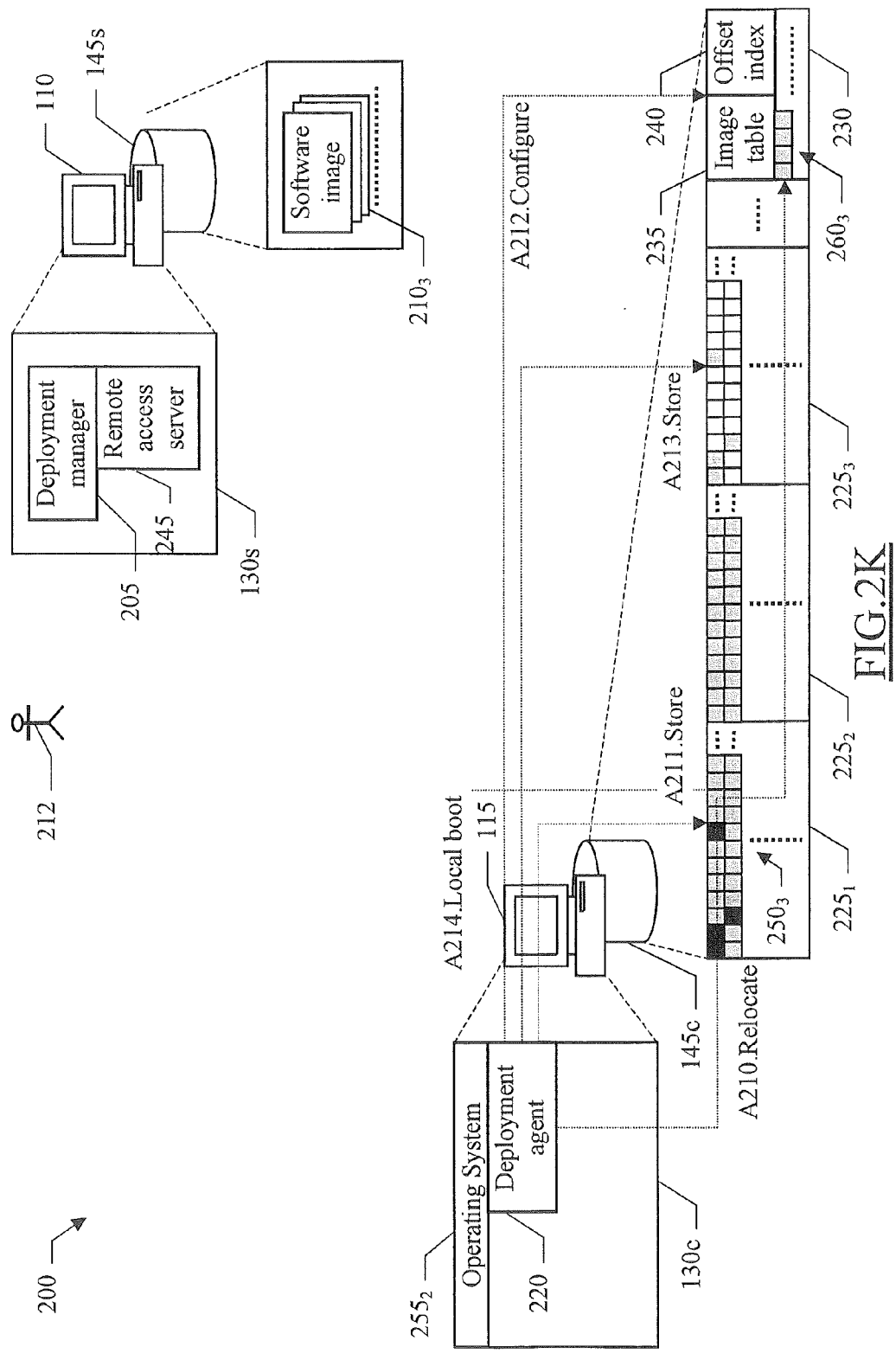

The deployment process then continues as above. Particularly, as shown in FIG. 2K, the deployment agent 220 relocates the memory blocks of the initial image portion $225_1$ that are stored in the boot locations of the new software image $210_3$ to the service portion 230, where they are denoted with the reference $260_3$ (same action "A210.Relocate"). At this point, the deployment agent 220 stores the boot blocks of the new software image $210_3$ into their boot locations—where they are shown in dark shading and denoted with the reference $250_3$ (same action "A211.Store"). The deployment agent 220 then identifies an image portion $225_i$ that is free to receive the software image $210_2$ (i.e., the image portion $225_3$). As a consequence, the deployment agent 220 accordingly updates the image table 235 (by asserting the flag of the image portion $225_3$ to indicate that is used) and the offset index 240 (by setting it to the offset of the image portion $225_3$ to indicate that it is the current one). Moreover, the deployment agent 220 saves the image addresses of the boot blocks $250_3$ into the record associated with the current image portion $225_3$ in the image table 235. The deployment agent 220 also creates the corresponding location map (not shown in the figure) in the current image portion $225_3$ (same action "A212.Configure"). The deployment agent 220 then stores the boot blocks of the new software image $210_3$ into the current image portion $225_3$—where they are shown in light shading (same action "A213.Store"). At this point, the deployment agent 220 turns off and then turns on the client computer 115 so as to boot it from its boot blocks $250_3$, thereby loading a portion of an operating system of the software image $210_3$ corresponding to the boot blocks $250_3$ and the deployment agent, which will serve every request of accessing any selected memory block of the new software image $210_3$, into the working memory 130c (same action "A14.Local boot").

In any case, once the deployment of one or more software images onto the client computer has been completed, it can work autonomously without any need of the server computer any longer. However, the same streaming technique that has been used during the deployment processes can also be exploited to create snapshots of the client computer (each one being formed by a consistent backup copy of a software image thereof at a particular point of time).

Particularly, FIG. 3A-FIG. 3E show a collaboration diagram representing the roles of the main software components (denoted as a whole with the reference 300) that may be used to implement a snapshot process according to an embodiment of the invention.

Figure 3A:
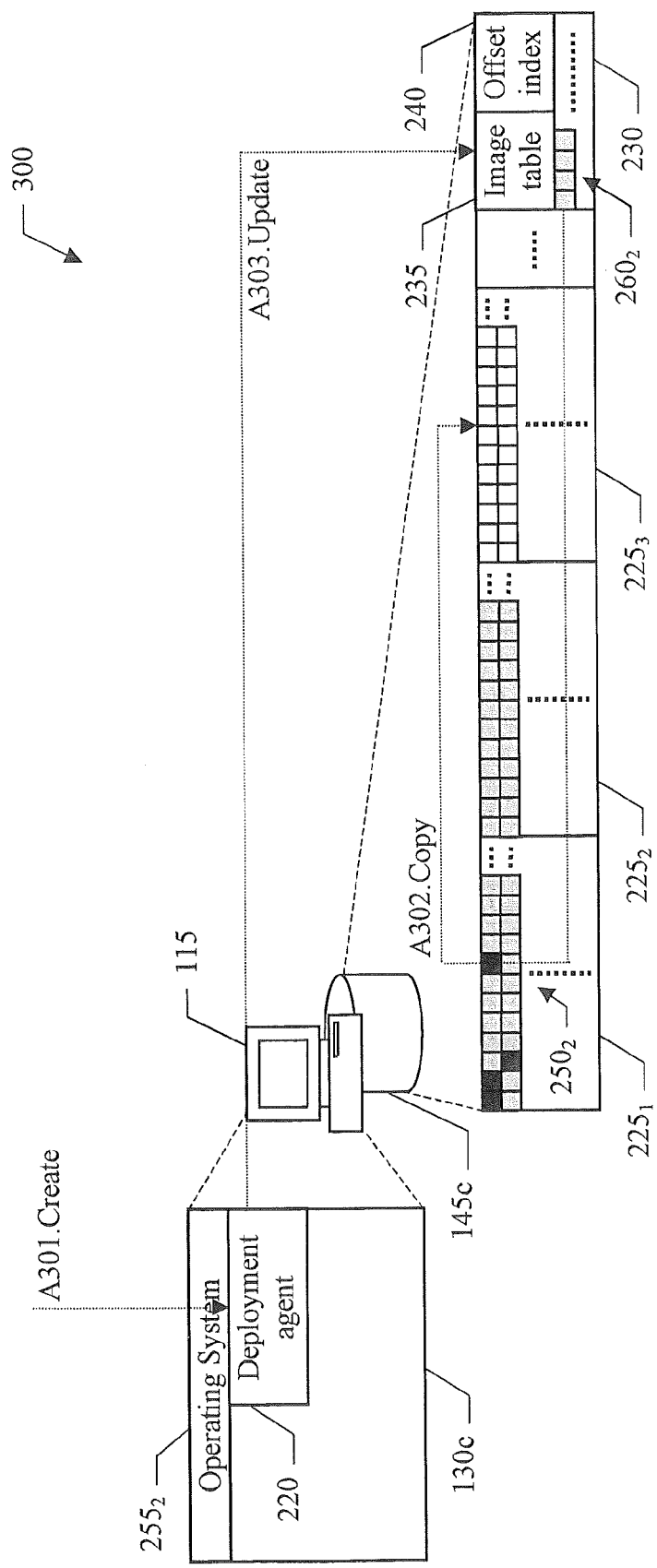
FIG. 3A-FIG. 3E show a collaboration diagram representing the roles of software components that may be used to implement a snapshot process in accordance with an embodiment.

Starting from FIG. 3A, consider, for example, a situation of the client computer 115 where two software images are stored in the image portions $225_1$ and $225_2$. The image portion $225_2$ is the current one, with its boot blocks $250_2$ that are also stored in their boot locations in the initial image portion $225_1$ (with the corresponding relocated memory blocks $260_2$ of the initial image portion $225_1$ saved in the service portion 230). A user of the client computer 115 may submit a command for creating a new snapshot of a source software image in a corresponding source image portion $225_i$, for example, the source image portion $225_1$ storing the source software image $210_1$ (action "A301.Create"). In response thereto, the deployment agent 220 at first identifies a target image portion $225_i$ that is free to receive the source software image $210_1$ (for example, the image portion $225_3$ in the example at issue). The deployment agent 220 then copies the whole source software image $210_1$ into the target image portion $225_3$. More specifically, for every current memory block (with a corresponding current image address) of the source software image $210_1$, if the source image portion $225_1$ is the initial one (as in this case) the deployment agent 220 verifies whether the current memory block has been relocated to the service portion 230 (i.e., the current image address is equal to the image address of one of the boot locations of the current software image portion $225_2$, as indicated in its record in the image table 235). If so, the corresponding relocated memory block $260_2$ is copied into the target image portion $225_3$, in the memory location having the memory address equal to the current image address plus the offset of the target image portion $225_3$. Conversely (i.e., when the current memory block has not been relocated, or always when the source image portion is not the initial one), the current memory block is copied from the source image portion $225_1$ to the target image portion $225_3$, i.e., from the memory location having the memory address equal to the current image address plus the offset of the source image portion $225_2$ to the memory location having the memory address equal to the current image address plus the offset of the target image portion $225_3$ (action "A302.Copy"). Once the whole source software image $210_1$ has been copied into the target image portion $225_3$, the deployment agent 220 accordingly updates the image table 235 by asserting the flag of the target image portion $225_3$ to indicate that is used, and saving the same image addresses of the boot blocks of the source software image $210_1$ (action "A303.Update"). Therefore, the operation of creating a snapshot of a software image is quite slow (with its length that is proportional to the size of the source software image to be copied).

Figure 3B:
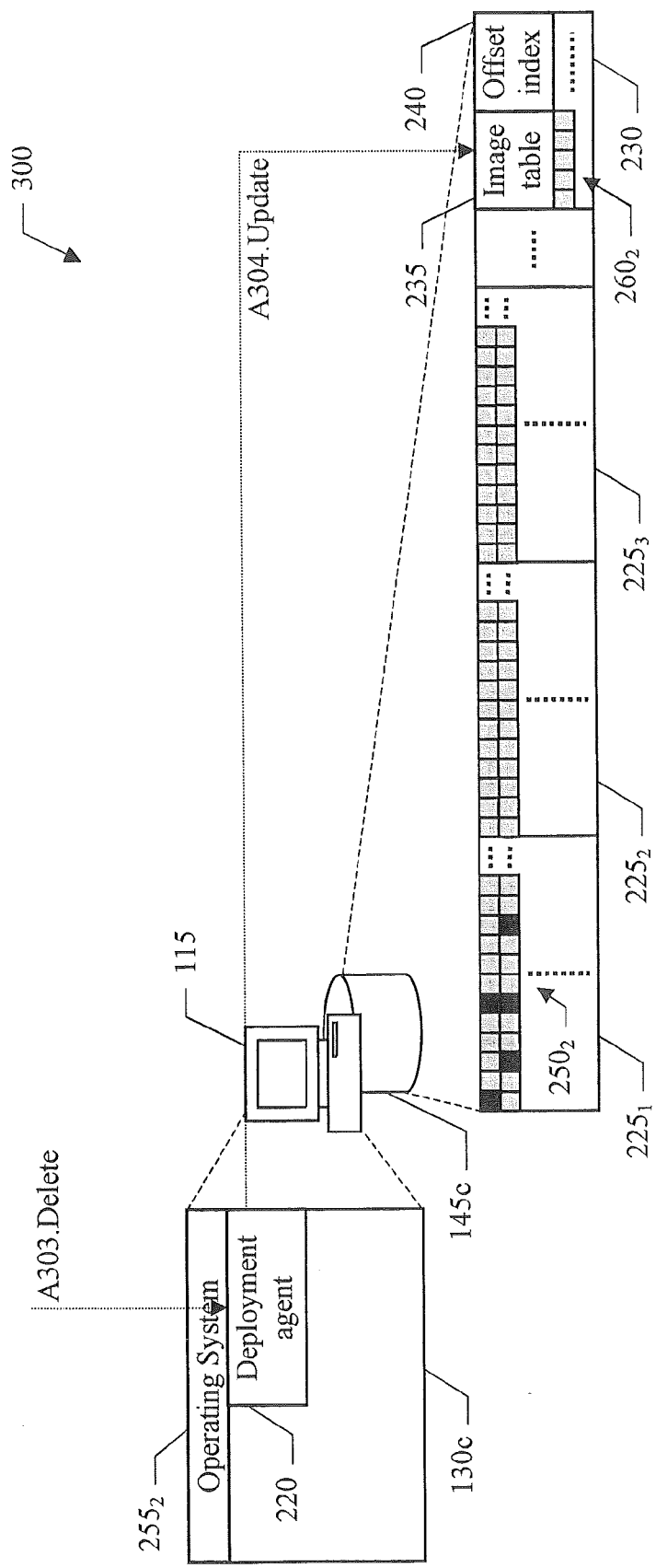

Moving to FIG. 3B, the user of the client computer 115 may also submit a command for deleting an obsolete software image (in a corresponding obsolete image portion $225_i$) to the deployment agent 220. In order to ensure continuity of operation of the client computer 115 after the deletion of the obsolete software image, the obsolete image portion $225_i$ should be different from the current image portion $225_2$, for example, the image portion $225_1$ (action "A304.Delete"). In response thereto, the deployment agent 220 simply updates the image table 235 by asserting the flag of the obsolete image portion $225_1$ to indicate that it is free (action "A304.Update"). Therefore, the operation of deleting a software image is very fast (since it does not require any actual action on its memory blocks). Moreover, this operation does not cause any problem even when the image portion to be deleted is the initial one (since the boot blocks of the current image portion $225_2$ stored therein are unaffected).

Figure 3C:
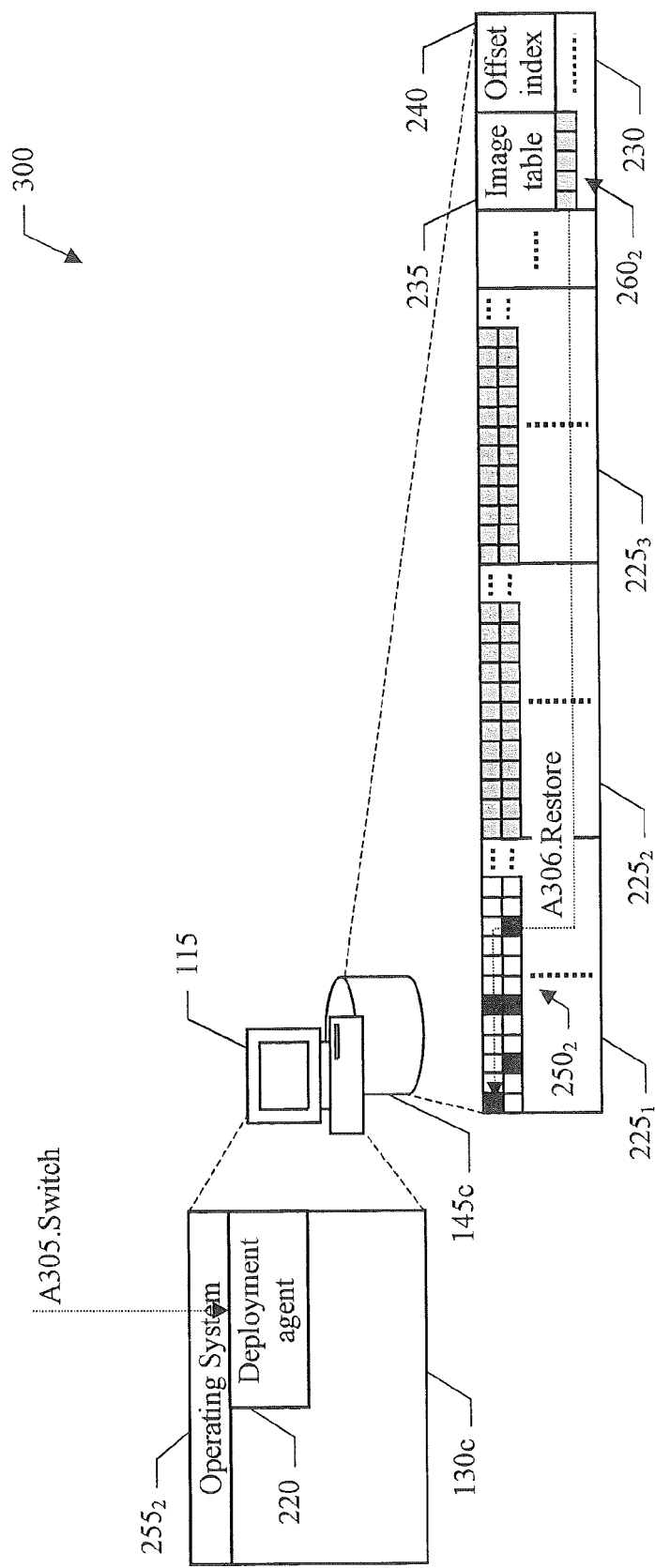

With reference now to FIG. 3C, the user of the client computer 115 may instead submit a command for switching from the current software image $225_2$ to another (previous) software image portion $225_i$, for example, the software image portion $225_3$ (action "A305.Switch"). In response thereto, as above, the deployment agent 220 restores the relocated memory blocks $260_2$ from the service portion 230 to the initial image portion $225_1$, i.e., at the boot locations of the current image portion $225_2$ (action "A306.Restore").

Figure 3D:
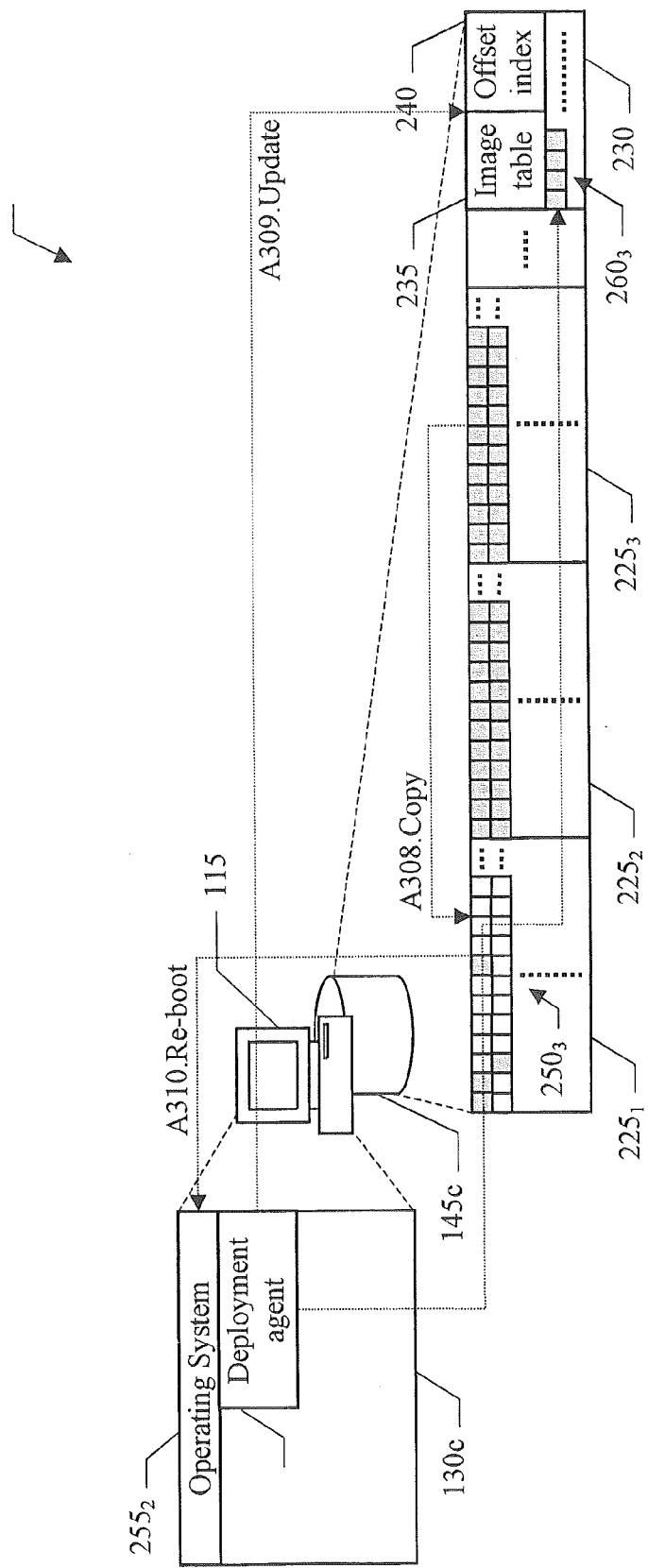

Moving to FIG. 3D, the deployment agent 220 relocates the memory blocks of the initial image portion $225_1$ that are stored in the boot locations of the previous software image $210_3$ to the service portion 230, where they are denoted with the reference $260_3$ (action "A307.Relocate"). The deployment agent 220 then copies the boot blocks of the previous software image $210_3$ into their boot locations, where they are shown in light shading and denoted with the reference $250_3$ (action "A308.Copy"). The deployment agent 220 can now update the offset index 240, by setting it to the offset of the previous image portion $225_3$ to indicate that it is now the current one (action "309.Update"). At this point, the deployment agent 220 turns off and then turns on the client computer 115 so as to boot it from its boot blocks $250_3$, thereby loading a portion of an operating system of the previous software image $210_3$, corresponding to the boot blocks $250_3$, and the deployment agent into the working memory 130c (action "A310.Re-boot").

Figure 3E:
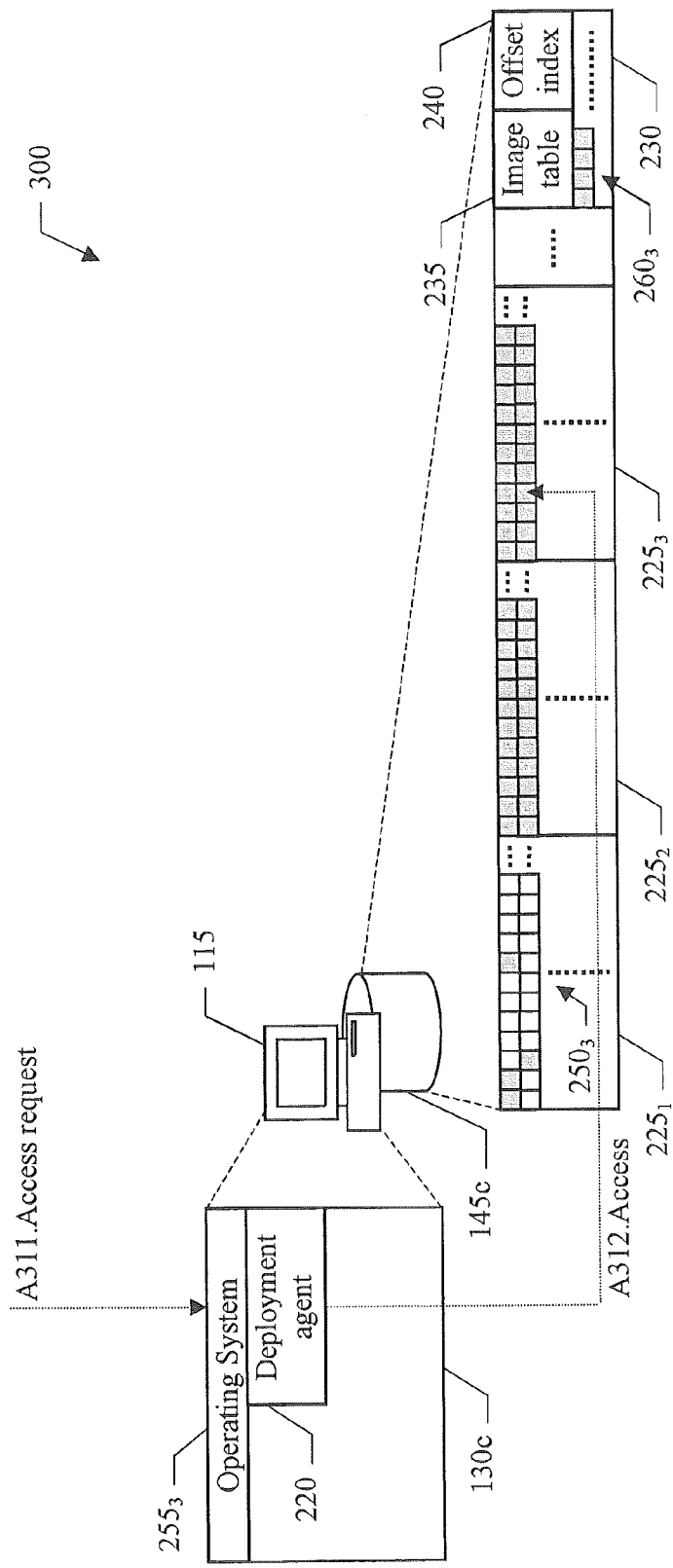

Considering now FIG. 3E, every request of accessing a selected memory block of the current software image $210_3$ during operation of the client computer 115 is again served by the streaming driver of the deployment agent 220 (which overrides a standard file-system driver, not shown in the figure, of the operating system $255_3$).

Particularly, the file-system driver receives a request for accessing (either in read or in write) the selected memory block—for example, from an application program not shown in the figure (action "A311.Access request"). The request is passed to the deployment agent 220, which directly accesses (through a physical disk driver, not shown in the figure, of the operating system $255_3$) the selected memory block in the current image portion $225_3$, i.e., in the memory location having the memory address equal to the image address of the selected memory block plus the offset of the current image portion $225_3$ (action "A311.Access").

The above-described technique allows managing multiple software images on the client computer in a very easy way. Moreover, the different software images are completely segregated from one another and each software image can only access the corresponding image portion (so as to prevent any risk of damaging the other image portions).

This result is achieved without requiring any virtualization infrastructure; therefore, the performance of the client computer is not adversely affected. Indeed, in this case only the software images (i.e., the mass memory where they are stored) are virtualized; conversely, the operating systems continue running natively on the client computer.

Particularly, this allows restoring a snapshot very fast (since it is already available on the client computer); moreover, the desired result may be achieved without requiring any network connection.

Figure 4:
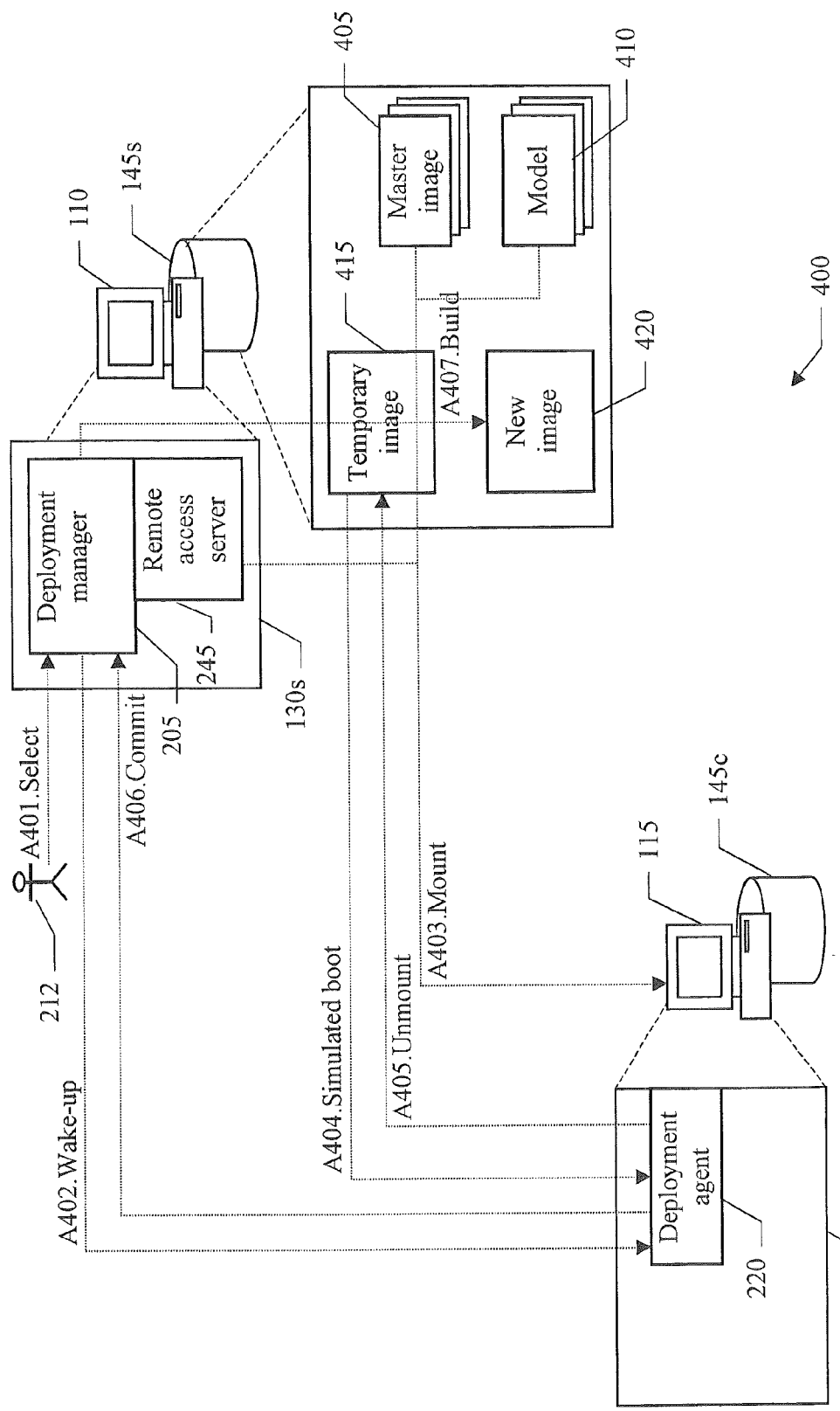
FIG. 4 shows a collaboration diagram representing the roles of software components that may be used to implement a preparation process in accordance with an embodiment.

Moving to FIG. 4, there is shown a collaboration diagram representing the roles of the main software components (denoted as a whole with the reference 400) that may be used to implement a preparation process of a generic software image to be used in the solution according to an embodiment of the invention. Particularly, this preparation process is aimed at identifying the boot blocks of the software image (to be used during the deployment process or the snapshot process described above).

For this purpose, the client computer 115 includes a repository of master software images (or simply master images) 405. Each master image 405 provides a basic version of a corresponding software image (for example, created by capturing the content of a hard-disk of a donor client computer wherein it was previously installed), where specific contents relating to any configuration of the donor client computer (for example, drivers and registry settings) have been removed. The client computer 115 also includes a repository of models 410; each model 410 instead includes contents specific for a corresponding configuration of the client computers.

The operator 212 selects a software image (including a selected master image 405 and a selected model 410) for a specific type of client computers (represented by a corresponding auxiliary client computer 115) through the deployment manager 205 (action "A401.Select"). In response thereto, the deployment manager 205 wakes up the deployment agent 220 on the auxiliary client computer 115, by passing an identifier of the selected software image (action "A402.Wake-up"). As a consequence, the deployment agent 220 mounts the selected software image as a remote disk (i.e., by acting as an iSCSI initiator in the example at issue) for accessing it remotely through the remote access server 245. As a result, a temporary software image (or simply "temporary image") 415 for exclusive access by the auxiliary client computer is created. The temporary image 415 is simply defined by an index structure pointing to the memory blocks of the selected master image 405 and of the selected model 410, i.e., without making any copy thereof. The temporary image 415 is mounted with a block-tracing function enabled, so as to trace the image address of any memory block of the temporary image 415 that is accessed (action "A403.Mount").

At this point, the deployment agent 220 simulates the boot sequence of the auxiliary client computer 115 on the temporary image 415 (up to the loading of the deployment agent). For example, in Microsoft Windows the deployment agent 220 reads the MBR, the boot sector, the bootmgr.exe file, the boot\bcd file, the system registry, the winload.exe file, the driver files specified in the system registry, and the deployment agent (action "A404.Simulated boot"). Once the simulated boot sequence has been completed, the deployment agent 220 unmounts the temporary image 415 (action "A405.Unmount"). The deployment agent 220 then commits the temporary image 415 to the deployment manager 205 (action "A406.Commit"). In response thereto, the deployment manager 205 builds a new software image (or simply new image) 420 from the temporary image 415 (simply defined by its index structure). Moreover, the new image 420 is associated with the list of the memory blocks that have been accessed during the simulated boot procedure, which memory blocks define the corresponding boot blocks (action "A407.Build").

It will be understood by one skilled in the art that many logical and/or physical modifications and alterations may be made to the embodiments described herein. More specifically, although the embodiments have been described with a certain degree of particularity, it should be understood that various omissions, substitutions and changes in the form and details as well as other embodiments are possible (for example, with respect to numerical values and compositions). Particularly, different embodiments of the invention may even be practiced without the specific details set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

For example, similar considerations apply if the same solution is implemented with an equivalent method (by using similar steps with the same function of more steps or portions thereof, removing some steps being non-essential, or adding further optional steps). Moreover, the steps may be performed in a different order, concurrently or in an interleaved way (at least in part).

The software images may include any software program (for example, only the operating system without any application programs). Moreover, even if the proposed technique has been specifically designed for use on physical computers, its application on virtual machines as well is not excluded. In addition, any equivalent structure may be used to provide the access function. In any case, the same technique may also be applied to any other operating system with whatever boot sequence. For example, in the Linux operating system, the boot blocks will include (in addition to the deployment agent) the MBR including the grand unified bootloader (GRBU) and the /boot directory including the kernel and the initial RAM disk (initrd) file system. (Linux is a registered trademark of Linus Torvalds in the United States, other countries, or both.) In this case, during the boot sequence the BIOS loads the MBR including the GRBU, the GRBU finds the /boot directory and loads the kernel and the initrd file system, the GRBU boots on the kernel, the kernel starts the initrd file system, and the initrd file system starts the deployment agent.

The step of restoring the relocated memory blocks when the client computer is switched to another software image is not strictly necessary. For example, it is also possible to relocate the memory blocks in the boot locations of all the software images different from the initial one into the relocation portion, and then restore all of them at the same time only when the client computer is switched to the initial software image (thereby making the switching operation faster, but at the cost of a waste of mass memory space).

In any case, the boot locations may be arranged in any position within the mass memory.

The image portions may be managed in an equivalent way; for example, it is possible to have image portions with different size (even defined dynamically when they are created).

Moreover, equivalent structures may be used to manage the status information of the image portions (for example, with each image partition that directly includes an indicator of its availability).

Even though in the preceding description reference has been made to a snapshot process implemented on the client computer when one or more software images are completely installed (so that no network connection is needed), the same technique may also be applied to software images that are only partially stored on the mass memory of the client computer (with the deployment of a software image that re-starts when the client computer is reverted to it).

In an alternative implementation, the deployment agent manages the current image portion by letting the corresponding operating system believe that its size is equal to the one of the current software image (without any re-sizing thereof, but with a corresponding waste of mass memory space).

The software images may be deployed with the above-described streaming technique from any external source (for example, a removable storage device). In addition, any equivalent structure may be used to manage the availability of the memory blocks in the mass memory (for example, by breaking the location map into chunks to allow their loading into the working memory of the client computer). Alternatively, it is also possible to maintain the streaming process always active, even after the software image has been completely downloaded (for example, for downloading up-to-date versions of the memory blocks in response to a reset of the corresponding flags in the location map).

In any case, the proposed technique is completely independent of how the software images have been deployed onto the client computer (for example, even manually without any server computer).

The possibility of copying the boot blocks only into their boot locations during the deployment of the corresponding software image (with their saving into its image portion only when the client computer switches to another software image) is not excluded.

Alternatively, it is possible to manage the writing of the memory blocks directly by the physical disk driver (without any passage through the deployment agent).

The workload may be monitored with any other frequency or only during specific periods (for example, at night); similar considerations apply if the workload is monitored only for the client computer, the server computer, the network, or any combination thereof. Moreover, the threshold value for the workload may be defined in any other way (for example, by weighting its contributions with different weights). Similar considerations apply if two or more memory blocks are downloaded at the same time when the workload falls below the threshold value. In any case, this feature may be omitted when the streaming process remains always active.

The software images may also be prepared in a different way (for example, by actually booting the auxiliary client computer and tracing the memory blocks that are accessed during the booting sequence to identify its boot blocks).

Similar considerations apply if the programs (which may be used to implement each embodiment of the invention) are structured in a different way, or if additional modules or functions are provided. Likewise, the memory structures may be of other types, or may be replaced with equivalent entities (not necessarily consisting of physical storage media). The program may take any form suitable to be used by any data-processing system or in connection therewith (for example, within a virtual machine); particularly, the program may be in the form of external or resident software, firmware, or microcode (either in object code or in source code—for example, to be compiled or interpreted). Moreover, it is possible to provide the program as an article of manufacture implemented on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed on otherwise configured.

Alternatively, the system has a different structure or includes equivalent components, or it has other operative characteristics. In any case, every component thereof may be separated into more elements, or two or more components may be combined together into a single element; moreover, each component may be replicated to support the execution of the corresponding operations in parallel. It is also pointed out that any interaction between different components generally does not need to be continuous (unless specified otherwise), and it may be either direct or indirect through one or more intermediaries. Particularly, the system may be based on a different architecture (for example, wide area, global, cellular or satellite network), and exploiting any type of (wired and/or wireless) connections. In any case, each computer may have another structure or may include similar elements (such as cache memories temporarily storing the programs or parts thereof); moreover, it is possible to replace the computer with any code execution entity (such as a PDA, a mobile phone, and the like), or with a combination of multiple entities.

The invention may be embodied in a computer program product including a non-transitory computer readable medium embodying a computer program, the computer program including code means directly loadable into a working memory of a data-processing system thereby configuring the data-processing system to perform the same method.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for managing multiple software images in a data processing entity that includes a mass memory with a plurality of memory locations, each of the memory locations having a corresponding memory address within the mass memory, each of the software images including a plurality of memory blocks, each of the memory blocks having a corresponding image address within the software image, comprising:
    storing at least part of the memory blocks of each of the software images into a corresponding image portion of the mass memory, each of the memory blocks being stored into the memory location having the memory address equal to the corresponding image address plus an offset of the image portion within the mass memory;
    selecting a current software image stored in a current image;
    relocating the memory blocks stored in boot locations of the current software image to a relocation portion of the mass memory, the boot locations of the current software image being the memory locations having the memory addresses equal to the image addresses of boot blocks of the current software image including the memory blocks thereof required to boot the data processing entity up to load an access function adapted to access the current software image;
    copying the boot blocks of the current software image into the corresponding boot locations;
    booting the data processing entity from the boot blocks of the current software image in the corresponding boot locations thereby loading the access function; and
    serving each request to access a selected memory block of the current software image by the access function, the access function accessing the selected memory block in the memory location having the memory address equal to the corresponding image address plus the offset of the current image portion.

2. The method according to claim 1, further comprising:
    restoring the memory blocks being relocated from the boot locations of a previous software image to the relocation portion into the boot locations of the previous software image before relocating the memory blocks stored in the boot locations of the current software image into the relocation portion.

3. The method according to claim 1, wherein the image portions include an initial image portion having a zero offset, the boot locations of all the image portions being included in the initial image portion, and wherein the relocating the memory blocks stored in the boot locations of the current software image and copying the boot blocks of the current software image are performed only when the current image portion is different from the initial image portion.

4. The method according to claim 1, further comprising:
    selecting a source software image stored in a source image portion to be snapshot; and
    copying each memory block of the source software image into a free image portion, the memory block of the source software image being copied from the relocation portion when relocated therein or from the source portion otherwise.

5. The method according to claim 1, further comprising:
    selecting an obsolete software image stored in an obsolete image portion to be deleted; and
    setting the obsolete image portion as free.

6. The method according to claim 1, wherein all the memory blocks of each software image are stored in the corresponding image portion.

7. The method according to claim 1, wherein the booting the data processing entity from the boot blocks of the current software image includes:
    resizing the current software image by the access function according to a size of the current image portion.

8. The method according to claim 1, further comprising:
    requesting a deployment of a new software image from an external source onto a new image portion of the data-processing entity;
    downloading the boot blocks of the new software image from the external source onto the data-processing entity;
    relocating the memory blocks stored in the boot locations of the new software image to the relocation portion;
    copying the boot blocks of the new software image into the corresponding boot locations;
    booting the data-processing entity from the boot blocks of the new software image in the corresponding boot locations thereby loading the access function; and
    serving each request of accessing a further selected memory block of the new software image by the access function, the access function performing one of:
        downloading the further selected memory block from the external source and storing the further selected memory block into the memory location having the memory address equal to the corresponding image address plus the offset of the new image portion in response to a lacking of the further selected memory block in the mass memory, and
        retrieving the further selected memory block from the memory location having the memory address equal to the corresponding image address plus the offset of the new image portion.

9. The method according to claim 8, further comprising:
    restoring the memory blocks being relocated from the boot locations of a current software image to the relocation portion into the boot locations of the current software image before relocating the memory blocks stored in the boot locations of the new software image.

10. The method according to claim 8, further comprising:
copying the boot blocks of the new software image into the memory locations having the memory addresses equal to the corresponding image addresses plus the offset of the new image portion.

11. The method according to claim 1, further comprising:
monitoring a workload of the data-processing entity; and
downloading a set of new memory blocks being not stored in the mass memory from the external source and storing the new memory blocks into the memory locations having the memory addresses equal to the corresponding image addresses plus the offset of the new image portion in response to the workload falling below a threshold value.

12. The method according to claim 1, further comprising preparing each software image by:
simulating a boot sequence of an auxiliary data processing entity from the software image up to the loading of the access function, each memory block of the software image accessed during the boot sequence being traced; and
identifying the boot blocks of the software image according to the traced memory blocks.

13. A computer program product comprising:
a computer readable storage medium having computer readable code embodied therewith, the computer readable program code comprising:
computer readable program code configured for:
managing multiple software images in a data processing entity that includes a mass memory with a plurality of memory locations, each of the memory locations having a corresponding memory address within the mass memory, each of the software images including a plurality of memory blocks, each of the memory blocks having a corresponding image address within the software image, wherein the managing includes:
storing at least part of the memory blocks of each of the software images into a corresponding image portion of the mass memory, each of the memory blocks being stored into the memory location having the memory address equal to the corresponding image address plus an offset of the image portion within the mass memory;
selecting a current software image stored in a current image;
relocating the memory blocks stored in boot locations of the current software image to a relocation portion of the mass memory, the boot locations of the current software image being the memory locations having the memory addresses equal to the image addresses of boot blocks of the current software image including the memory blocks thereof required to boot the data processing entity up to load an access function adapted to access the current software image;
copying the boot blocks of the current software image into the corresponding boot locations;
booting the data processing entity from the boot blocks of the current software image in the corresponding boot locations thereby loading the access function; and
serving each request to access a selected memory block of the current software image by the access function, the access function accessing the selected memory block in the memory location having the memory address equal to the corresponding image address plus the offset of the current image portion.

14. The computer program product according to claim 13, wherein the computer readable program code is further configured for:
restoring the memory blocks being relocated from the boot locations of a previous software image to the relocation portion into the boot locations of the previous software image before relocating the memory blocks stored in the boot locations of the current software image into the relocation portion.

15. The computer program product according to claim 13, wherein the image portions include an initial image portion having a zero offset, the boot locations of all the image portions being included in the initial image portion, and wherein the relocating the memory blocks stored in the boot locations of the current software image and copying the boot blocks of the current software image are performed only when the current image portion is different from the initial image portion.

16. The computer program product according to claim 13, wherein the computer readable program code is further configured for:
selecting a source software image stored in a source image portion to be snapshot; and
copying each memory block of the source software image into a free image portion, the memory block of the source software image being copied from the relocation portion when relocated therein or from the source portion otherwise.

17. The computer program product according to claim 13, wherein the computer readable program code is further configured for:
requesting a deployment of a new software image from an external source onto a new image portion of the data-processing entity;
downloading the boot blocks of the new software image from the external source onto the data-processing entity;
relocating the memory blocks stored in the boot locations of the new software image to the relocation portion;
copying the boot blocks of the new software image into the corresponding boot locations;
booting the data-processing entity from the boot blocks of the new software image in the corresponding boot locations thereby loading the access function; and
serving each request of accessing a further selected memory block of the new software image by the access function, the access function performing one of:
downloading the further selected memory block from the external source and storing the further selected memory block into the memory location having the memory address equal to the corresponding image address plus the offset of the new image portion in response to a lacking of the further selected memory block in the mass memory, and
retrieving the further selected memory block from the memory location having the memory address equal to the corresponding image address plus the offset of the new image portion.

18. A computer system comprising:
a processor configured for:
managing multiple software images in a data processing entity that includes a mass memory with a plurality of memory locations, each of the memory locations having a corresponding memory address within the mass memory, each of the software images including a plurality of memory blocks, each of the memory blocks having a corresponding image address within the software image, wherein the managing includes:
storing at least part of the memory blocks of each of the software images into a corresponding image portion of the mass memory, each of the memory blocks being stored into the memory location having the memory address equal to the corresponding image address plus an offset of the image portion within the mass memory;

selecting a current software image stored in a current image;

relocating the memory blocks stored in boot locations of the current software image to a relocation portion of the mass memory, the boot locations of the current software image being the memory locations having the memory addresses equal to the image addresses of boot blocks of the current software image including the memory blocks thereof required to boot the data processing entity up to load an access function adapted to access the current software image;

copying the boot blocks of the current software image into the corresponding boot locations;

booting the data processing entity from the boot blocks of the current software image in the corresponding boot locations thereby loading the access function; and serving each request to access a selected memory block of the current software image by the access function, the access function accessing the selected memory block in the memory location having the memory address equal to the corresponding image address plus the offset of the current image portion.

19. The system according to claim 18, wherein the processor is further configured for:

restoring the memory blocks being relocated from the boot locations of a previous software image to the relocation portion into the boot locations of the previous software image before relocating the memory blocks stored in the boot locations of the current software image into the relocation portion.

20. The system according to claim 18, wherein the processor is further configured for:

requesting a deployment of a new software image from an external source onto a new image portion of the data-processing entity;

downloading the boot blocks of the new software image from the external source onto the data-processing entity;

relocating the memory blocks stored in the boot locations of the new software image to the relocation portion;

copying the boot blocks of the new software image into the corresponding boot locations;

booting the data-processing entity from the boot blocks of the new software image in the corresponding boot locations thereby loading the access function; and serving each request of accessing a further selected memory block of the new software image by the access function, the access function performing one of:

downloading the further selected memory block from the external source and storing the further selected memory block into the memory location having the memory address equal to the corresponding image address plus the offset of the new image portion in response to a lacking of the further selected memory block in the mass memory, and retrieving the further selected memory block from the memory location having the memory address equal to the corresponding image address plus the offset of the new image portion.

* * * * *